(12) United States Patent
Luke et al.

(10) Patent No.: US 10,681,542 B2
(45) Date of Patent: Jun. 9, 2020

(54) APPARATUS, METHOD AND ARTICLE FOR AUTHENTICATION, SECURITY AND CONTROL OF PORTABLE CHARGING DEVICES AND POWER STORAGE DEVICES, SUCH AS BATTERIES

(71) Applicant: Gogoro Inc., Hong Kong (CN)

(72) Inventors: Hok-Sum Horace Luke, Mercer Island, WA (US); Ching Chen, Taipei (TW)

(73) Assignee: Gogoro Inc., Hong Kong (CN)

( * ) Notice: Subject to any disclaimer, the term of this patent is extended or adjusted under 35 U.S.C. 154(b) by 0 days.

(21) Appl. No.: 15/853,438

(22) Filed: Dec. 22, 2017

(65) Prior Publication Data

US 2018/0270661 A1 Sep. 20, 2018

Related U.S. Application Data

(63) Continuation of application No. 14/017,090, filed on Sep. 3, 2013, now Pat. No. 9,854,438.

(Continued)

(51) Int. Cl.
*H02J 7/00* (2006.01)
*H04W 12/06* (2009.01)
(Continued)

(52) U.S. Cl.
CPC ............ *H04W 12/06* (2013.01); *B60L 53/30* (2019.02); *B60L 53/65* (2019.02); *H02J 5/00* (2013.01);
(Continued)

(58) Field of Classification Search
USPC ........................................................ 320/106
See application file for complete search history.

(56) References Cited

U.S. PATENT DOCUMENTS 1,387,848 A 8/1921 Good
3,664,450 A 5/1972 Udden et al.
(Continued)

FOREIGN PATENT DOCUMENTS

BR 112015021624 7/2017
CN 101887985 11/2010
(Continued)

OTHER PUBLICATIONS

Chen et al., "Apparatus, System, and Method for Authentication of Vehicular Components," U.S. Appl. No. 13/918,703, filed Jun. 14, 2013, 84 pages.

(Continued)

*Primary Examiner* — Samuel Berhanu
(74) *Attorney, Agent, or Firm* — Perkins Coie LLP

(57) ABSTRACT

A network of collection, charging and distribution machines collect, charge and distribute portable electrical energy storage devices (e.g., batteries, supercapacitors or ultracapacitors). To charge, the machines employ electrical current from an external source, such as the electrical grid or an electrical service of an installation location. Users may also use portable charging devices that authenticate portable electrical energy storage devices or are authenticated by portable electrical energy storage devices before the charging is allowed or enabled. This authentication may be via wired or wireless communication channels between the portable charging device and portable electrical energy storage device, such as via near field communication (NFC) channels.

17 Claims, 9 Drawing Sheets

Related U.S. Application Data

(60) Provisional application No. 61/773,621, filed on Mar. 6, 2013.

(51) Int. Cl.
| | | |
|---|---|---|
| *H02J 5/00* | (2016.01) | |
| *H04B 5/00* | (2006.01) | |
| *B60L 53/30* | (2019.01) | |
| *B60L 53/65* | (2019.01) | |
| *H02J 7/34* | (2006.01) | |
| *H04B 5/02* | (2006.01) | |
| *H01M 10/42* | (2006.01) | |

(52) U.S. Cl.
CPC .......... *H02J 7/0013* (2013.01); *H02J 7/0045* (2013.01); *H04B 5/0031* (2013.01); *B60L 2240/70* (2013.01); *B60L 2250/20* (2013.01); *H01M 10/4257* (2013.01); *H02J 7/0027* (2013.01); *H02J 7/00034* (2020.01); *H02J 7/00045* (2020.01); *H02J 7/345* (2013.01); *H04B 5/0062* (2013.01); *H04B 5/02* (2013.01); *Y02T 10/7011* (2013.01); *Y02T 10/7072* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(56) References Cited

U.S. PATENT DOCUMENTS

| | | |
|---|---|---|
| 3,678,455 A | 7/1972 | Levey |
| 4,087,895 A | 5/1978 | Etienne |
| 4,216,839 A | 8/1980 | Gould et al. |
| 5,187,423 A | 2/1993 | Marton |
| 5,189,325 A | 2/1993 | Jarczynski |
| 5,236,069 A | 8/1993 | Peng |
| 5,339,250 A | 8/1994 | Durbin |
| 5,349,535 A | 9/1994 | Gupta |
| 5,544,784 A | 8/1996 | Malaspina |
| 5,596,261 A | 1/1997 | Suyama |
| 5,627,752 A | 5/1997 | Buck et al. |
| 5,631,536 A | 5/1997 | Tseng |
| 5,642,270 A | 6/1997 | Green et al. |
| 5,839,800 A | 11/1998 | Koga et al. |
| 5,898,282 A | 4/1999 | Drozdz et al. |
| 5,998,963 A | 12/1999 | Aarseth |
| 6,005,367 A * | 12/1999 | Rohde .................. H02J 7/0004 320/106 |
| 6,016,882 A | 1/2000 | Ishikawa |
| 6,177,879 B1 | 1/2001 | Kokubu et al. |
| 6,403,251 B1 | 6/2002 | Baggaley et al. |
| 6,498,457 B1 | 12/2002 | Tsuboi |
| 6,515,580 B1 | 2/2003 | Isoda et al. |
| 6,583,592 B2 | 6/2003 | Omata et al. |
| 6,593,713 B2 | 7/2003 | Morimoto et al. |
| 6,796,396 B2 | 9/2004 | Kamen et al. |
| 6,822,560 B2 | 11/2004 | Geber et al. |
| 6,854,773 B2 | 2/2005 | Lin |
| 6,899,268 B2 | 5/2005 | Hara |
| 6,952,795 B2 | 10/2005 | O'Gorman et al. |
| 7,010,682 B2 | 3/2006 | Reinold et al. |
| 7,131,005 B2 | 10/2006 | Levenson et al. |
| 7,415,332 B2 | 8/2008 | Ito et al. |
| 7,426,910 B2 | 9/2008 | Elwart |
| 7,495,543 B2 | 2/2009 | Denison et al. |
| 7,567,166 B2 | 7/2009 | Bourgine De Meder |
| 7,592,728 B2 | 9/2009 | Jones et al. |
| 7,778,746 B2 | 8/2010 | McLeod et al. |
| 7,898,439 B2 | 3/2011 | Bettez et al. |
| 7,908,020 B2 | 3/2011 | Pieronek |
| 7,948,207 B2 | 5/2011 | Scheucher |
| 7,979,147 B1 | 7/2011 | Dunn |
| 7,993,155 B2 | 8/2011 | Heichal et al. |
| 8,006,793 B2 | 8/2011 | Heichal et al. |
| 8,006,973 B2 | 8/2011 | Toba et al. |
| 8,013,571 B2 | 9/2011 | Agassi et al. |
| 8,035,341 B2 | 10/2011 | Genzel et al. |
| 8,035,349 B2 | 10/2011 | Lubawy |
| 8,063,762 B2 | 11/2011 | Sid |
| 8,068,952 B2 | 11/2011 | Valentine et al. |
| 8,106,631 B2 | 1/2012 | Abe |
| 8,118,132 B2 | 2/2012 | Gray, Jr. |
| 8,164,300 B2 | 4/2012 | Agassi et al. |
| 8,229,625 B2 | 7/2012 | Lal et al. |
| 8,265,816 B1 | 9/2012 | LaFrance |
| 8,326,259 B2 | 12/2012 | Gautama et al. |
| 8,354,768 B2 | 1/2013 | Cipriani |
| 8,378,627 B2 | 2/2013 | Asada et al. |
| 8,412,401 B2 | 4/2013 | Bertosa et al. |
| 8,437,908 B2 | 5/2013 | Goff et al. |
| 8,614,565 B2 | 12/2013 | Lubawy |
| 8,836,279 B2 * | 9/2014 | Nakano .................. H02J 50/80 320/108 |
| 9,854,438 B2 | 12/2017 | Luke et al. |
| 2001/0018903 A1 | 9/2001 | Hirose et al. |
| 2002/0023789 A1 | 2/2002 | Morisawa et al. |
| 2003/0141840 A1 | 7/2003 | Sanders |
| 2003/0163434 A1 | 8/2003 | Barends |
| 2003/0209375 A1 | 11/2003 | Suzuki et al. |
| 2004/0236615 A1 | 11/2004 | Msndy |
| 2005/0048359 A1 * | 3/2005 | Yamada ................ H01M 10/46 429/90 |
| 2006/0208850 A1 | 9/2006 | Ikeuchi et al. |
| 2006/0284601 A1 | 12/2006 | Salasoo et al. |
| 2007/0026996 A1 | 2/2007 | Ayabe et al. |
| 2007/0035397 A1 | 2/2007 | Patenaude et al. |
| 2007/0069687 A1 * | 3/2007 | Suzuki .................. H02J 7/0036 320/108 |
| 2007/0090921 A1 | 4/2007 | Fisher |
| 2007/0145945 A1 | 6/2007 | McGinley et al. |
| 2007/0159297 A1 | 7/2007 | Paulk et al. |
| 2007/0208468 A1 | 9/2007 | Sankaran et al. |
| 2009/0033456 A1 | 2/2009 | Castillo et al. |
| 2009/0082957 A1 | 3/2009 | Agassi et al. |
| 2009/0140690 A1 * | 6/2009 | Jung ..................... H02J 7/025 320/108 |
| 2009/0240575 A1 | 9/2009 | Bettez et al. |
| 2009/0251300 A1 * | 10/2009 | Yasuda ............... B60L 11/1816 340/426.1 |
| 2009/0294188 A1 | 12/2009 | Cole |
| 2010/0026238 A1 | 2/2010 | Suzuki et al. |
| 2010/0051363 A1 | 3/2010 | Inoue et al. |
| 2010/0052588 A1 | 3/2010 | Okamura et al. |
| 2010/0089547 A1 | 4/2010 | King et al. |
| 2010/0094496 A1 | 4/2010 | Hershkovitz et al. |
| 2010/0114798 A1 | 5/2010 | Sirton |
| 2010/0161481 A1 | 6/2010 | Littrell |
| 2010/0181964 A1 | 7/2010 | Huggins et al. |
| 2010/0201482 A1 | 8/2010 | Robertson et al. |
| 2010/0235043 A1 | 9/2010 | Seta et al. |
| 2010/0308989 A1 | 12/2010 | Gasper |
| 2011/0025267 A1 | 2/2011 | Kamen et al. |
| 2011/0029157 A1 | 2/2011 | Muzaffer |
| 2011/0031929 A1 | 2/2011 | Asada et al. |
| 2011/0032110 A1 | 2/2011 | Taguchi |
| 2011/0071932 A1 | 3/2011 | Agassi et al. |
| 2011/0106329 A1 | 5/2011 | Donnelly et al. |
| 2011/0112710 A1 | 5/2011 | Meyer-Ebeling et al. |
| 2011/0114798 A1 | 5/2011 | Gemmati |
| 2011/0120789 A1 | 5/2011 | Teraya |
| 2011/0148346 A1 | 6/2011 | Gagosz et al. |
| 2011/0153141 A1 | 6/2011 | Beechie et al. |
| 2011/0160992 A1 | 6/2011 | Crombez |
| 2011/0169447 A1 | 7/2011 | Brown et al. |
| 2011/0200193 A1 | 8/2011 | Blitz et al. |
| 2011/0202476 A1 | 8/2011 | Nagy et al. |
| 2011/0224900 A1 | 9/2011 | Hiruta et al. |
| 2011/0270480 A1 | 11/2011 | Ishibashi et al. |
| 2011/0279257 A1 | 11/2011 | Au et al. |
| 2011/0292667 A1 | 12/2011 | Meyers |
| 2011/0295454 A1 | 12/2011 | Meyers |

(56) References Cited

U.S. PATENT DOCUMENTS

| | | |
|---|---|---|
| 2011/0303509 A1 | 12/2011 | Agassi et al. |
| 2012/0000720 A1 | 1/2012 | Honda et al. |
| 2012/0017282 A1* | 1/2012 | Kang .................... G06F 21/10 726/26 |
| 2012/0019196 A1 | 1/2012 | Fung |
| 2012/0038473 A1 | 2/2012 | Fecher |
| 2012/0062361 A1 | 3/2012 | Kosugi |
| 2012/0068817 A1 | 3/2012 | Fisher |
| 2012/0078413 A1 | 3/2012 | Baker, Jr. |
| 2012/0105078 A1 | 5/2012 | Kikuchi et al. |
| 2012/0109519 A1 | 5/2012 | Uyeki |
| 2012/0123661 A1 | 5/2012 | Gray, Jr. |
| 2012/0126969 A1 | 5/2012 | Wilbur et al. |
| 2012/0157083 A1 | 6/2012 | Otterson |
| 2012/0158229 A1 | 6/2012 | Schaefer |
| 2012/0194346 A1 | 8/2012 | Tsai et al. |
| 2012/0248868 A1 | 10/2012 | Mobin et al. |
| 2012/0256588 A1 | 10/2012 | Hayashi et al. |
| 2012/0259665 A1 | 10/2012 | Pandhi et al. |
| 2012/0299537 A1 | 11/2012 | Kikuchi |
| 2012/0316671 A1 | 12/2012 | Hammerslag et al. |
| 2013/0024306 A1 | 1/2013 | Shah et al. |
| 2013/0026971 A1 | 1/2013 | Luke et al. |
| 2013/0026972 A1 | 1/2013 | Luke et al. |
| 2013/0026973 A1 | 1/2013 | Luke et al. |
| 2013/0027183 A1 | 1/2013 | Wu et al. |
| 2013/0030580 A1 | 1/2013 | Luke et al. |
| 2013/0030581 A1 | 1/2013 | Luke et al. |
| 2013/0030608 A1 | 1/2013 | Taylor et al. |
| 2013/0030630 A1 | 1/2013 | Luke et al. |
| 2013/0030696 A1 | 1/2013 | Wu et al. |
| 2013/0030920 A1 | 1/2013 | Wu et al. |
| 2013/0031318 A1 | 1/2013 | Chen et al. |
| 2013/0033203 A1 | 2/2013 | Luke et al. |
| 2013/0046457 A1 | 2/2013 | Pettersson |
| 2013/0074411 A1 | 3/2013 | Ferguson et al. |
| 2013/0090795 A1 | 4/2013 | Luke et al. |
| 2013/0093271 A1 | 4/2013 | Luke et al. |
| 2013/0093368 A1 | 4/2013 | Luke et al. |
| 2013/0093384 A1 | 4/2013 | Nyu et al. |
| 2013/0116892 A1 | 5/2013 | Wu et al. |
| 2013/0119898 A1 | 5/2013 | Ohkura |
| 2013/0127416 A1 | 5/2013 | Karner et al. |
| 2013/0132307 A1 | 5/2013 | Phelps et al. |
| 2013/0181582 A1 | 7/2013 | Luke et al. |
| 2013/0200845 A1 | 8/2013 | Bito |
| 2013/0254097 A1 | 9/2013 | Marathe et al. |
| 2013/0282254 A1 | 10/2013 | Dwan et al. |
| 2014/0253021 A1 | 9/2014 | Luke et al. |

FOREIGN PATENT DOCUMENTS

| | | |
|---|---|---|
| CN | 102566006 | 7/2012 |
| CN | 105340147 | 2/2016 |
| EP | 0693813 | 1/1996 |
| EP | 2101390 | 9/2009 |
| EP | 2230146 | 9/2010 |
| EP | 2428939 | 3/2012 |
| EP | 2965400 | 1/2016 |
| FR | 2970125 | 7/2012 |
| JP | 07-031008 | 1/1995 |
| JP | 7-36504 | 7/1995 |
| JP | 9-119839 | 5/1997 |
| JP | 10-170293 | 6/1998 |
| JP | 10-307952 | 11/1998 |
| JP | 11-049079 | 2/1999 |
| JP | 11-51681 | 2/1999 |
| JP | 11-176487 | 7/1999 |
| JP | 11-205914 | 7/1999 |
| JP | 2000-102102 | 4/2000 |
| JP | 2000-102103 | 4/2000 |
| JP | 2000-341868 | 12/2000 |
| JP | 2001-128301 | 5/2001 |
| JP | 2003-118397 | 4/2003 |
| JP | 2003-262525 | 9/2003 |
| JP | 2005-067453 | 3/2005 |
| JP | 2007-060353 | 3/2007 |
| JP | 2009-171646 | 7/2009 |
| JP | 2009-171647 | 7/2009 |
| JP | 4319289 | 8/2009 |
| JP | 2010-022148 | 1/2010 |
| JP | 2010-191636 | 9/2010 |
| JP | 2010-200405 | 9/2010 |
| JP | 2010-269686 | 12/2010 |
| JP | 2011-126452 | 6/2011 |
| JP | 2011-131631 | 7/2011 |
| JP | 2011-142704 | 7/2011 |
| JP | 2016517257 | 6/2016 |
| KR | 1998-045020 | 9/1998 |
| KR | 2004-0005146 | 1/2004 |
| KR | 20100012401 | 2/2010 |
| KR | 10-0971278 | 7/2010 |
| KR | 20110004292 | 1/2011 |
| KR | 20110041783 | 4/2011 |
| TW | 200836452 | 9/2008 |
| TW | I315116 | 9/2009 |
| TW | M371880 | 1/2010 |
| TW | M379269 | 4/2010 |
| TW | M379789 | 5/2010 |
| TW | M385047 | 7/2010 |
| TW | 201043986 | 12/2010 |
| TW | 201044266 | 12/2010 |
| WO | 98/21132 | 5/1998 |
| WO | 2009/039454 | 3/2009 |
| WO | 2010/033517 | 3/2010 |
| WO | 2010/143483 | 12/2010 |
| WO | 2011/138205 | 11/2011 |
| WO | 2012/160407 | 11/2012 |
| WO | 2012/160557 | 11/2012 |
| WO | 2013/016548 | 1/2013 |
| WO | 2013/024483 | 2/2013 |
| WO | 2013/024484 | 2/2013 |
| WO | 2013/074819 | 5/2013 |
| WO | 2013/080211 | 6/2013 |
| WO | 2013/102894 | 7/2013 |
| WO | 2013/108246 | 7/2013 |
| WO | 2014/118113 | 8/2013 |
| WO | 2013/142154 | 9/2013 |
| WO | 2013/144951 | 10/2013 |
| WO | 2014/138463 | 9/2014 |

OTHER PUBLICATIONS

Chen et al., "Apparatus, System, and Method for Authentication of Vehicular Components," U.S. Appl. No. 61/783,041, filed Mar. 14, 2013, 84 pages.

Chen et al., "Apparatus, System, and Method for Authentication of Vehicular Components," Office Action dated Nov. 22, 2013, for U.S. Appl. No. 13/918,703, 35 pages.

Chen et al., "Apparatus, Method and Article for Providing Vehicle Diagnostic Data," U.S. Appl. No. 61/601,404, filed Feb. 21, 2012, 56 pages.

Chen et al., "Apparatus, Method and Article for Providing Vehicle Diagnostic Data," U.S. Appl. No. 14/022,134, filed Sep. 9, 2013, 61 pages.

Huang et al., "Apparatus, Method and Article for Vehicle Turn Signals," U.S. Appl. No. 61/727,403, filed Nov. 16, 2012, 41 pages.

Huang et al., "Apparatus, Method and Article for Vehicle Turn Signals," U.S. Appl. No. 14/079,894, filed Nov. 14, 2013, 41 pages.

International Search Report and Written Opinion for corresponding European Patent Application No. PCT/US2012/048349, dated Feb. 18, 2013, 9 pages.

International Search Report and Written Opinion for corresponding European Patent Application No. PCT/US2012/048354, dated Feb. 18, 2013, 11 pages.

International Search Report and Written Opinion for corresponding European Patent Application No. PCT/US2012/048358, dated Feb. 25, 2013, 9 pages.

International Search Report and Written Opinion for corresponding European Patent Application No. PCT/US2012/048366, dated Jan. 21, 2013, 10 pages.

(56) References Cited

OTHER PUBLICATIONS

International Search Report and Written Opinion for corresponding European Patent Application No. PCT/US2012/048367, dated Jan. 17, 2013, 8 pages.
International Search Report and Written Opinion for corresponding European Patent Application No. PCT/US2012/048375, dated Jan. 23, 2013, 9 pages.
International Search Report and Written Opinion for corresponding European Patent Application No. PCT/US2012/048379, dated Dec. 17, 2012, 9 pages.
International Search Report and Written Opinion for corresponding International Application No. PCT/US2012/048391, dated Dec. 21, 2012, 9 pages.
International Search Report and Written Opinion for corresponding International Patent Application No. PCT/US2012/048380, dated Feb. 27, 2013, 9 pages.
International Search Report and Written Opinion for corresponding International Patent Application No. PCT/US2012/048382, dated Feb. 27, 2013, 9 pages.
International Search Report and Written Opinion for corresponding European Patent Application No. PCT/US2012/063979, dated Mar. 4, 2013, 10 pages.
Luke et al., "Apparatus, Method and Article for Authentication, Security and Control of Portable Charging Devices and Power Storage Devices, Such as Batteries," U.S. Appl. No. 61/773,621, filed Mar. 6, 2013, 69 pages.
Luke et al., "Apparatus, Method and Article for Providing Targeted Advertising in a Rechargeable Electrical Power Storage Device Distribution Environment," U.S. Appl. No. 61/773,614, filed Mar. 6, 2013, 77 pages.
Luke et al., "Detectible Indication of an Electric Motor Vehicle Standby Mode," U.S. Appl. No. 61/543,720, filed Oct. 5, 2011, 35 pages.
Luke et al., "Detectible Indication of an Electric Motor Vehicle Standby Mode," U.S. Appl. No. 61/684,432, filed Aug. 17, 2012, 41 pages.
Luke et al., "Modular System for Collection and Distribution of Electric Storage Devices," U.S. Appl. No. 61/789,065, filed Mar. 15, 2013, 76 pages.
Luke et al., "Apparatus, Method and Article for Authentication, Security and Control of Power Storage Devices, Such as Batteries," U.S. Appl. No. 61/534,761, filed Sep. 14, 2011, 55 pages.
Luke et al., "Apparatus, Method and Article for Authentication, Security and Control of Power Storage Devices, Such as Batteries, Based on User Profiles," U.S. Appl. No. 61/534,772, filed Sep. 14, 2011, 55 pages.
Luke et al., "Apparatus, Method and Article for Authentication, Security and Control of Power Storage Devices, Such as Batteries," U.S. Appl. No. 14/023,344, filed Sep. 10, 2013, 59 pages.
Luke et al., "Apparatus, Method and Article for Collection, Charging and Distributing Power Storage Devices, Such as Batteries," U.S. Appl. No. 61/511,900, filed Jul. 26, 2011, 73 pages.
Luke et al., "Apparatus, Method and Article for Collection, Charging and Distributing Power Storage Devices, Such as Batteries," U.S. Appl. No. 61/647,936, filed May 16, 2012, 76 pages.
Luke et al., "Apparatus, Method and Article for Redistributing Power Storage Devices, Such as Batteries, Between Collection, Charging and Distribution Machines," U.S. Appl. No. 61/534,753, filed Sep. 14, 2011, 65 pages.
Luke et al., "Apparatus, Method and Article for Redistributing Power Storage Devices, Such as Batteries, Between Collection Charging and Distribution Machines," U.S. Appl. No. 13/559,091, filed Jul. 26, 2012, 69 pages.
Luke et al., "Detectible Indication of an Electric Motor Vehicle Standby Mode," U.S. Appl. No. 13/646,320, filed Oct. 5, 2012, 41 pages.
Luke et al., "Dynamically Limiting Vehicle Operation for Best Effort Economy," U.S. Appl. No. 61/511,880, filed Jul. 26, 2011, 52 pages.
Luke et al., "Dynamically Limiting Vehicle Operation for Best Effort Economy," Office Action for U.S. Appl. No. 13/559,264, dated Aug. 14, 2013, 21 pages.
Luke et al., "Thermal Management of Components in Electric Motor Drive Vehicles," U.S. Appl. No. 61/647,941, filed May 16, 2012, 47 pages.
Luke et al., "Thermal Management of Components in Electric Motor Drive Vehicles," U.S. Appl. No. 61/511,887, filed Jul. 26, 2011, 44 pages.
Luke, "Apparatus, Method and Article for Changing Portable Electrical Power Storage Device Exchange Plans," U.S. Appl. No. 61/778,038, filed Mar. 12, 2013, 56 pages.
Luke, "Apparatus, Method and Article for Providing Information Regarding a Vehicle via a Mobile Device," U.S. Appl. No. 14/017,081, filed Sep. 3, 2013, 81 pages.
Luke, "Apparatus, Method and Article for Providing Information Regarding a Vehicle via a Mobile Device," U.S. Appl. No. 61/780,781, filed Mar. 13, 2013, 80 pages.
Taylor et al., "Apparatus, Method and Article for Physical Security of Power Storage Devices in Vehicles," U.S. Appl. No. 61/557,170, filed Nov. 8, 2011, 60 pages.
Taylor et al., "Apparatus, Method and Article for Physical Security of Power Storage Devices in Vehicles," Notice of Allowance for U.S. Appl. No. 13/559,054, dated May 30, 2013, 32 pages.
Taylor et al., "Apparatus, Method and Article for Physical Security of Power Storage Devices in Vehicles," Office Action for U.S. Appl. No. 13/559,054, dated Dec. 3, 2012, 11 pages.
Taylor et al., "Apparatus, Method and Article for Physical Security of Power Storage Devices in Vehicles," U.S. Appl. No. 14/012,845, filed Aug. 28, 2013, 64 pages.
Wu et al., "Battery Configuration for an Electric Vehicle," U.S. Appl. No. 61/716,388, filed Oct. 19, 2012, 37 pages.
Wu et al., "Apparatus, Method and Article for a Power Storage Device Compartment," U.S. Appl. No. 61/581,566, filed Dec. 29, 2011, 61 pages.
Wu et al., "Apparatus, Method and Article for Providing Information Regarding Availability of Power Storage Devices at a Power Storage Device Collection, Charging and Distribution Machine," U.S. Appl. No. 61/601,953, filed Feb. 22, 2012, 53 pages.
Wu et al., "Apparatus, Method and Article for Providing Locations of Power Storage Device Collection, Charging and Distribution Machines," U.S. Appl. No. 61/601,949, filed Feb. 22, 2012, 56 pages.
Wu et al., "Apparatus, Method and Article for Providing Locations of Power Storage Device Collection, Charging and Distribution Machines," Office Action for U.S. Appl. No. 13/559,333, dated Jul. 3, 2013, 14 pages.
Wu et al., "Apparatus, Method and Article for Providing Locations of Power Storage Device Collection, Charging and Distribution Machines," U.S. Appl. No. 14/022,147, filed Sep. 9, 2013, 56 pages.
Wu et al., "Apparatus, Method and Article for Providing Locations of Power Storage Device Collection, Charging and Distribution Machines," Office Action dated Nov. 19, 2013, for U.S. Appl. No. 14/022,147, 10 pages.
Wu et al., "Apparatus, Method and Article for Providing Locations of Power Storage Device Collection, Charging and Distribution Machines," Office Action dated Nov. 27, 2013, for U.S. Appl. No. 13/559,333, 19 pages.
Wu et al., "Apparatus, Method and Article for Security of Vehicles," U.S. Appl. No. 61/557,176, filed Nov. 8, 2011, 37 pages.
Wu, "Battery Configuration for an Electric Vehicle," U.S. Appl. No. 14/057,405, filed Oct. 18, 2013, 38 pages.
Chen et al., "Apparatus, Method and Article for Providing Vehicle Diagnostic Data," Office Action dated Dec. 30, 2013, for U.S. Appl. No. 14/022,134, 20 pages.
Chen et al., "Apparatus, System, and Method for Authentication of Vehicular Components," Notice of Allowance dated Mar. 25, 2014, for U.S. Appl. No. 13/918,703, 7 pages.
Communication pursuant to Rules 161(2) and 162 EPC, for corresponding European Patent Application No. 12817273.1, dated Mar. 25, 2014, 3 pages.

(56) References Cited

OTHER PUBLICATIONS

Communication pursuant to Rules 161(2) and 162 EPC, for corresponding European Patent Application No. 12817141.0, dated Mar. 26, 2014, 3 pages.
Communication pursuant to Rules 161(2) and 162 EPC, for corresponding European Patent Application No. 12818308.4, dated Mar. 26, 2014, 3 pages.
Communication pursuant to Rules 161(2) and 162 EPC, for corresponding European Patent Application No. 12817696.3, dated Mar. 27, 2014, 3 pages.
Communication pursuant to Rules 161(2) and 162 EPC, for corresponding European Patent Application No. 12817883.7, dated Mar. 27, 2014, 3 pages.
Communication pursuant to Rules 161(2) and 162 EPC, for corresponding European Patent Application No. 12818447.0, dated Mar. 27, 2014, 3 pages.
International Preliminary Report on Patentability and Written Opinion for corresponding International Patent Application No. PCT/US2012/048349, dated Jan. 28, 2014, 5 pages.
International Preliminary Report on Patentability and Written Opinion for corresponding International Patent Application No. PCT/US2012/048354, dated Jan. 28, 2014, 7 pages.
International Preliminary Report on Patentability and Written Opinion for corresponding International Patent Application No. PCT/US2012/048358, dated Jan. 28, 2014, 5 pages.
International Preliminary Report on Patentability and Written Opinion for corresponding International Patent Application No. PCT/US2012/048366, dated Jan. 28, 2014, 5 pages.
International Preliminary Report on Patentability and Written Opinion for corresponding International Patent Application No. PCT/US2012/048367, dated Jan. 28, 2014, 4 pages.
International Preliminary Report on Patentability and Written Opinion for corresponding International Patent Application No. PCT/US2012/048375, dated Jan. 28, 2014, 5 pages.
International Preliminary Report on Patentability and Written Opinion for corresponding International Patent Application No. PCT/US2012/048379, dated Jan. 28, 2014, 5 pages.
International Preliminary Report on Patentability and Written Opinion for corresponding International Patent Application No. PCT/US2012/048380, dated Jan. 28, 2014, 5 pages.
International Preliminary Report on Patentability and Written Opinion for corresponding International Patent Application No. PCT/US2012/048382, dated Jan. 28, 2014, 5 pages.
International Preliminary Report on Patentability and Written Opinion for corresponding International Patent Application No. PCT/US2012/048391, dated Jan. 28, 2014, 6 pages.
International Search Report and Written Opinion for corresponding International Patent Application No. PCT/US2012/048347, dated Dec. 18, 2012, 8 pages.
International Search Report and Written Opinion for corresponding International Application No. PCT/US2013/070131, dated Feb. 19, 2014, 17 pages.
Luke et al., "Drive Assembly for Electric Powered Device," U.S. Appl. No. 61/546,411, filed Oct. 12, 2011, 18 pages.
Luke et al., "Modular System for Collection and Distribution of Electric Storage Devices," U.S. Appl. No. 14/202,589, filed Mar. 10, 2014, 76 pages.
Luke et al., "Apparatus, Method and Article for Authentication, Security and Control of Power Storage Devices, Such as Batteries," Office Action dated Feb. 26, 2014, for U.S. Appl. No. 13/559,038, 13 pages.
Luke et al., "Apparatus, Method and Article for Authentication, Security and Control of Power Storage Devices, Such as Batteries," Office Action dated Feb. 25, 2014, for U.S. Appl. No. 14/023,344, 12 pages.
Luke et al., "Dynamically Limiting Vehicle Operation for Best Effort Economy," Office Action for U.S. Appl. No. 13/559,264, dated Feb. 12, 2014, 24 pages.

Luke, "Apparatus, Method and Article for Providing Information Regarding a Vehicle via a Mobile Device," Office Action for U.S. Appl. No. 14/017,081, dated Jan. 30, 2014, 36 pages.
Wu et al., "Apparatus, Method and Article for a Power Storage Device Compartment," Office Action for U.S. Appl. No. 13/559,125, dated Feb. 24, 2014, 28 pages.
Wu et al., "Apparatus, Method and Article for Providing Information Regarding Availability of Power Storage Devices at a Power Storage Device Collection, Charging and Distribution Machine," U.S. Appl. No. 14/022,140, filed Sep. 9, 2013, 56 pages.
Wu et al., "Apparatus, Method and Article for Providing Information Regarding Availability of Power Storage Devices at a Power Storage Device Collection, Charging and Distribution Machine," Office Action dated Mar. 5, 2014, for U.S. Appl. No. 14/022,140, 8 pages.
Wu et al., "Apparatus, Method and Article for Providing Locations of Power Storage Device Collection, Charging and Distribution Machines," Office Action dated Mar. 5, 2014, for U.S. Appl. No. 14/022,147, 12 pages.
"Inrunner," retrieved from RL=http://en.wikipedia.org/w/index.php?title=Inrunner&printable=yes on Sep. 28, 2011, 1 page.
"Outrunner," retrieved from URL=http://en.wikipedia.org/w/index.php?title=Outrunner&printable=yes on Sep. 16, 2011, 2 pages.
Chen et al., "Adjusting Electric Vehicle Systems Based on an Electrical Energy Storage Device Thermal Profile," U.S. Appl. No. 61/862,854, filed Aug. 6, 2013, 74 pages.
Chen et al., "Apparatus, Method and Article for Providing Vehicle Diagnostic Data," Office Action dated Apr. 9, 2014, for U.S. Appl. No. 14/022,134, 20 pages.
Chen et al., "Systems and Methods for Powering Electric Vehicles Using a Single or Multiple Power Cells," U.S. Appl. No. 61/862,852, filed Aug. 6, 2013, 46 pages.
International Search Report and Written Opinion for corresponding International Patent Application No. PCT/US2012/048344, dated Feb. 28, 2013, 9 pages.
International Search Report and Written Opinion for corresponding International Application No. PCT/US2012/058930, dated Mar. 15, 2013, 11 pages.
International Search Report and Written Opinion for corresponding International Application No. PCT/US2012/059931, dated Mar. 29, 2013, 13 pages.
Luke et al., "Portable Electrical Energy Storage Device," U.S. Appl. No. 61/872,126, filed Aug. 30, 2013, 39 pages.
Luke et al., "Electric Device Drive Assembly and Cooling System," U.S. Appl. No. 61/615,144, filed Mar. 23, 2012, 43 pages.
Luke et al., "Thermal Management of Components in Electric Motor Drive Vehicles," Office Action dated Apr. 2, 2014, for U.S. Appl. No. 13/559,259, 11 pages.
Luke, "Apparatus, Method and Article for Changing Portable Electrical Power Storage Device Exchange Plans," U.S. Appl. No. 14/204,587, filed Mar. 11, 2014, 56 pages.
Microchip, "AN885: Brushless DC (BLDC) Motor Fundamentals," Microchip Technology Inc., 2003, 19 pages.
Wu et al., "Apparatus, Method and Article for Power Storage Device Failure Safety," U.S. Appl. No. 14/071,134, filed Nov. 4, 2013, 68 pages.
Wu et al., "Apparatus, Method and Article for Power Storage Device Failure Safety," Office Action for U.S. Appl. No. 14/071,134, dated Feb. 12, 2014, 14 pages.
International Search Report and Written Opinion, for corresponding International Application No. PCT/US2014/021369, dated Jul. 2, 2014, 14 pages.
Zheng, Li et al., "Electric Vehicles Network With Nomadic Portable Charging Stations", 72nd IEEE Vehicular Technology Conference Fall (VTC), Mitsubishi Electric Research Laboratories, Inc., Oct. 4, 2010 (Oct. 4, 2010), XP05311498, DOI:10:1109/VETECF, 2010:5594437, 5 pages.

* cited by examiner

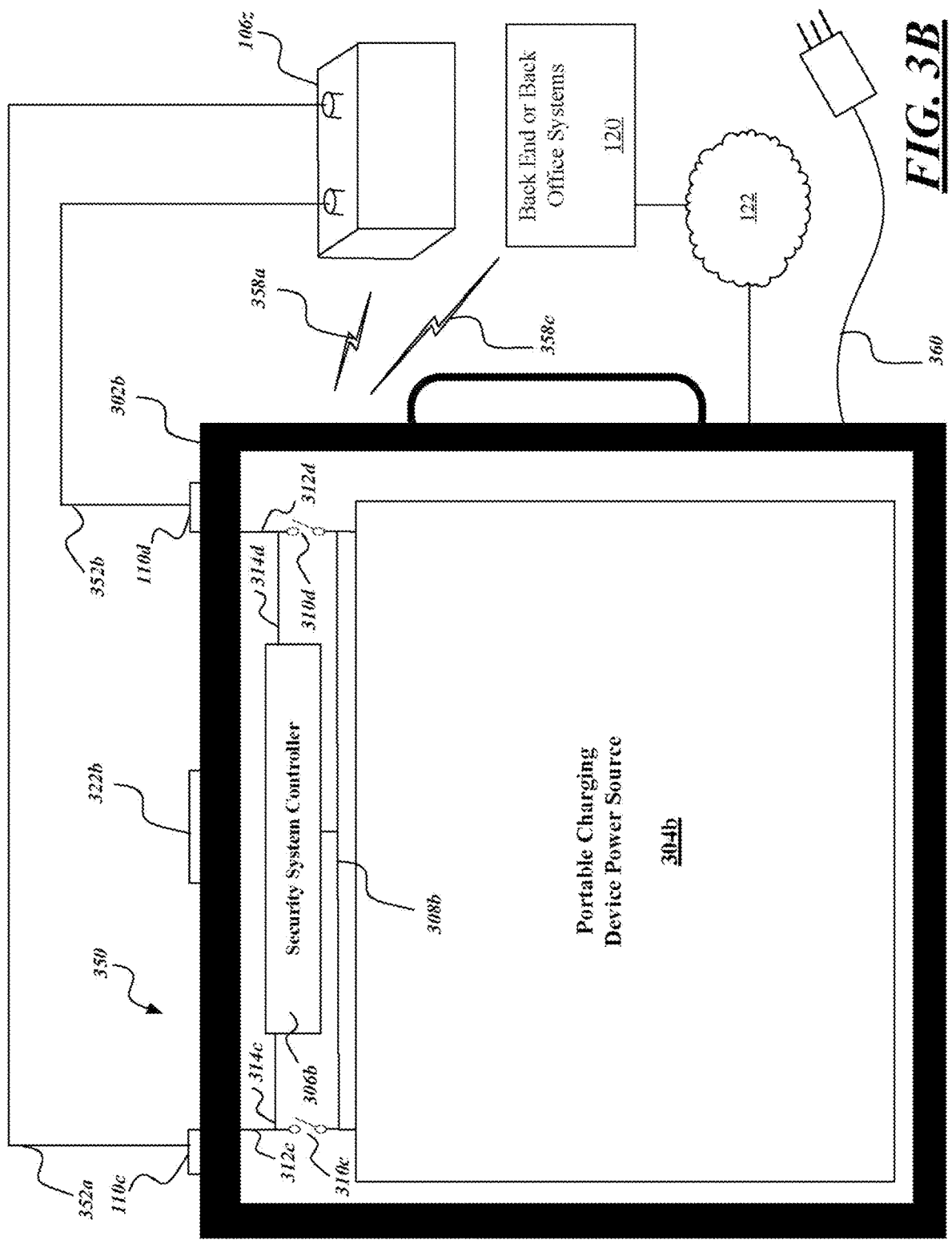

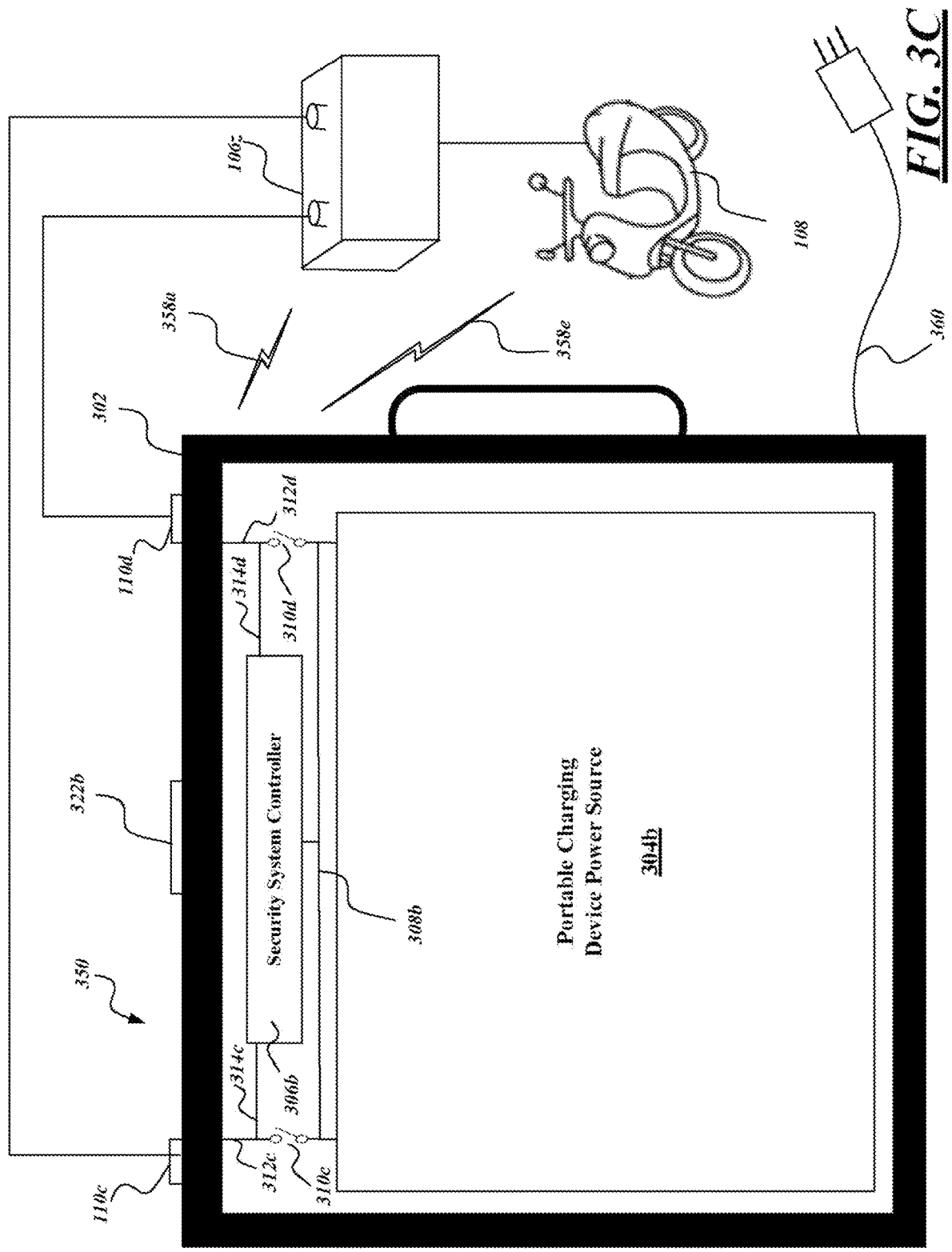

APPARATUS, METHOD AND ARTICLE FOR AUTHENTICATION, SECURITY AND CONTROL OF PORTABLE CHARGING DEVICES AND POWER STORAGE DEVICES, SUCH AS BATTERIES

CROSS-REFERENCE TO RELATED APPLICATIONS

This application is a continuation of U.S. patent application Ser. No. 14/017,090, filed Sep. 3, 2013 (U.S. Pat. No. 9,854,438), which claims the benefit of Provisional Application No. 61/773,621, filed Mar. 6, 2013, both of which are incorporated by reference herein in their entireties.

BACKGROUND

Technical Field

The present disclosure generally relates to the charging and energy release from rechargeable electrical power storage devices and portable charging devices (e.g., secondary batteries, supercapacitors or ultracapacitors), which may be suitable for use in a variety of fields or applications, for instance transportation and non-transportation uses.

Description of the Related Art

There are a wide variety of uses or applications for portable electrical power storage devices.

One such application is in the field of transportation. Hybrid and all electrical vehicles are becoming increasingly common. Such vehicles may achieve a number of advantages over traditional internal combustion engine vehicles. For example, hybrid or electrical vehicles may achieve higher fuel economy and may have little or even zero tail pipe pollution. In particular, all electric vehicles may not only have zero tail pipe pollution, but may be associated with lower overall pollution. For example, electrical power may be generated from renewable sources (e.g., solar, hydro). Also for example, electrical power may be generated at generation plants that produce no air pollution (e.g., nuclear plants). Also for example, electrical power may be generated at generation plants that burn relatively "clean burning" fuels (e.g., natural gas), which have higher efficiency than internal combustion engines, and/or which employ pollution control or removal systems (e.g., industrial air scrubbers) which are too large, costly or expensive for use with individual vehicles.

Personal transportation vehicles such as combustion engine powered scooters and/or motorbikes are ubiquitous in many places, for example in the many large cities of Asia. Such scooters and/or motorbikes tend to be relatively inexpensive, particular as compared to automobiles, cars or trucks. Cities with high numbers of combustion engine scooters and/or motorbikes also tend to be very densely populated and suffer from high levels of air pollution. When new, many combustion engine scooters and/or motorbikes are equipped with a relatively low polluting source of personal transportation. For instance, such scooters and/or motorbikes may have higher mileage ratings than larger vehicles. Some scooters and/or motorbikes may even be equipped with basic pollution control equipment (e.g., catalytic converter). Unfortunately, factory specified levels of emission are quickly exceeded as the scooters and/or motorbikes are used and either not maintained and/or as the scooters and/or motorbikes are modified, for example by intentional or unintentional removal of catalytic converters. Often owners or operators of scooters and/or motorbikes lack the financial resources or the motivation to maintain their vehicles.

It is known that air pollution has a negative effect on human health, being associated with causing or exacerbating various diseases (e.g., various reports tie air pollution to emphysema, asthma, pneumonia, cystic fibrosis as well as various cardiovascular diseases). Such diseases take large numbers of lives and severely reduce the quality of life of countless others.

BRIEF SUMMARY

Zero tail pipe pollution alternatives to combustion engines would greatly benefit air quality, and hence the health of large populations.

While the zero tail pipe emissions benefit of all-electric vehicles are appreciated, adoption of all-electric vehicles by large populations has been slow. One of the reasons appears to be the cost, particularly the cost of secondary batteries. Another one of the reasons appears to be the limited driving range available on a single charge of a battery, and the relatively long time (e.g., multiple hours) necessary to fully recharge a secondary battery when depleted.

The approaches described herein may address some of the issues which have limited adoption of zero tail pipe emission technology, particularly in densely crowded cities, and in populations with limited financial resources.

For example, some of the approaches described herein employ collection, charging and distribution machines, which may be otherwise be termed as kiosks or vending machines, to collect, charge and distribute electrical power storage devices (e.g., batteries, supercapacitors or ultracapacitors). Such machines may be distributed about a city or other region at a variety of locations, such as convenience stores or existing gas or petrol filling stations.

The collection, charging and distribution machines may maintain a stock of fully charged or almost fully charged electrical storage devices for use by end users. The collection, charging and distribution machines may collect, receive or otherwise accept depleted electrical storage devices, for example as returned by end users, recharging such for reuse by subsequent end users.

Thus, as some collection, charging and distribution machines may not have inventory of fully charged batteries or may not be conveniently located to a particular user, an end user may desire to use a portable charging device to charge their battery or batteries or other electrical power storage devices. This may address issues related to cost, limited availability, as well as limited range and relatively long recharging times at collection, charging and distribution machines.

As previously noted, secondary batteries and other electrical power storage devices are relatively expensive. Thus, it is beneficial to stock the least number of electrical power storage devices possible, while still ensuring that demand for such is satisfied. This may also be facilitated by use of portable charging device by users such that fewer charged batteries need to be stocked at various collection, charging and distribution machines.

A portable charging device security system of a portable charging device for charging a portable electrical energy storage device may be summarized as including at least one controller; and at least one communications module coupled to the at least one controller, wherein the at least one controller is configured to: receive information regarding authentication of a portable electrical energy storage device to be charged by the portable charging device; make a determination regarding allowing charging of the portable electrical energy storage device by the portable charging device based on the received information regarding authentication; and record or communicate information regarding the charging to track usage of the portable charging device. Recording or communicating information regarding the charging to track usage of the portable charging device may be based on the determination regarding allowing the charging of the portable electrical energy storage device based on the received information regarding authentication.

The at least one controller may be further configured to allow the charging of the portable electrical energy storage device if the portable electrical energy storage device is authenticated based on the information regarding authentication. Allowing the charging of the portable electrical energy storage device may include sending a signal enabling the portable electrical energy storage device to be charged.

The portable charging device security system may further include a switch coupled to at least one terminal of the portable charging device and to a power source of the portable charging device, the switch configured to be activated by a control signal generated by the controller of the portable charging device security system, wherein the controller is configured to: send the signal in a manner enabling the portable electrical energy storage device to be charged, such that the control signal causes the switch to close to complete a circuit such as to allow electrical current to flow from the portable charging device causing the portable electrical energy storage device to charge if the portable electrical energy storage device is authenticated based on the information regarding authentication; and upon the portable electrical energy storage device being disconnected from the portable charging device, send the signal in a manner preventing the portable charging device from providing a charge, such that the control signal causes the switch to break the circuit and prevent electrical current to flow from the portable charging device. The at least one controller may be configured to receive the information regarding authentication via a near field communication (NFC) wireless signal transmitted between the portable charging device and the portable electrical energy storage device.

The at least one controller may be further configured to track usage of the of the portable charging device based on an amount of charge provided by the portable charging device or received by the portable electrical energy storage device.

The at least one controller may be further configured to track usage of the of the portable charging device based on a user account associated with the portable charging device or the portable electrical energy storage device.

The at least one controller may be further configured to communicate to an external device information regarding usage of the of the portable charging device to charge the portable electrical energy storage device.

The at least one controller may be further configured to associate information regarding usage of the of the portable charging device with a user account associated with one or more of: the portable charging device and the portable electrical energy storage device. The information regarding authentication of the portable electrical energy storage device may be information regarding one or more of: a vehicle associated with the portable electrical energy storage device and a user associated with the vehicle.

A method in a portable electrical energy storage device security system may be summarized as including receiving information regarding authentication of a portable charging device to which to connect the portable electrical energy storage device for charging of the portable electrical energy storage device; and making a determination regarding allowing the charging from the device based on the received information regarding authentication; recording or communicating information regarding the charging to track usage of the portable charging device. Recording or communicating information regarding the charging to track usage of the portable charging device may be based on the determination regarding allowing the charging from the portable charging device is based on the received information regarding authentication.

The method may further include accepting the portable electrical energy storage device charge from the portable charging device if the portable charging device is authenticated based on the information regarding authentication. Accepting the portable electrical energy storage device charge may include sending a signal enabling the portable electrical energy storage device to be charged.

The method may further include activating a switch coupled to at least one terminal of the portable electrical energy storage device and to a cell of the portable electrical energy storage device, by a control signal generated by the controller of the portable electrical energy storage device security system; sending the signal in a manner enabling the portable electrical energy storage device to be charged by causing the switch to close to complete a circuit such as to allow electrical current to flow from the portable charging device causing the portable electrical energy storage device to charge if the portable charging device is authenticated based on the information regarding authentication; and upon the portable electrical energy storage device being disconnected from the portable charging device, sending the signal in a manner preventing the portable electrical energy storage from accepting a charge by causing the switch to break the circuit and prevent electrical current to flow from the portable charging device. Receiving information regarding authentication of the portable charging device may include receiving the information regarding authentication via a near field communication (NFC) wireless signal transmitted between the portable charging device and the portable electrical energy storage device.

The method may further include tracking usage of the portable charging device based on an amount of charge from the portable charging device received by the portable electrical energy storage device.

The method may further include tracking usage of the portable charging device based on a user account associated with the portable charging device or the portable electrical energy storage device.

The method may further include communicating to an external device information regarding usage of the portable charging device to charge the portable electrical energy storage device.

The method may further include associating information regarding usage of the portable charging device with a user account associated with one or more of: the portable charging device and the portable electrical energy storage device. The information regarding authentication of the portable charging device may be information regarding one or more of: a vehicle associated with the portable charging device and a user associated with the vehicle.

A portable charging device may be summarized as including a charging device charging power source; and a security system operably coupled to the power source, the security system configured to: receive information regarding authentication of a portable electrical energy storage device to be charged by the portable charging device over a near field communication signal; and allow the portable charging device to provide, or prevent the portable charging device from providing, a charge to the portable electrical energy storage device based on the received information regarding authentication of the portable electrical energy storage device.

The security system may be further configured to determine how much energy to release, if any, from the portable charging device for charging the portable electrical energy storage device, based on a response received or lack of a response received to a request from the security system for information regarding authentication of the portable electrical energy storage device.

The security system may be further configured to send a control signal enabling the portable electrical energy storage device to accept a charge by the portable charging device based on the received information regarding authentication of the portable electrical energy storage device.

A method in a portable electrical energy storage device security system may be summarized as including receiving, by a security system controller, information regarding authentication of a charging device for a portable electrical energy storage device over a near field communication signal; and allowing, by a security system controller, the portable electrical energy storage device to discharge, or preventing, by a security system controller, the portable electrical energy storage device from discharging based on the received information regarding authentication of the charging device.

Received information regarding authentication of the charging device may be information indicative of a detected charge level of the pesd being increased without the authentication having been performed before the detected increase and wherein the security system configured to prevent the portable electrical energy storage device from discharging in response to receiving the information indicative of a detected charge level of the pesd being increased without the authentication having been performed before the detected increase.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

FIG. 3B is a block diagram of a portable charging device connected to portable electrical energy storage device and in communication with the back end or back office system of FIG. 1, according to one non-limiting illustrated embodiment.

FIG. 3C is a block diagram of a portable charging device connected to and in communication with the portable electrical energy storage device and/or with the vehicle of FIG. 1, according to one non-limiting illustrated embodiment.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with vending apparatus, batteries, supercapacitors or ultracapacitors, power converters including but not limited to transformers, rectifiers, DC/DC power converters, switch mode power converters, controllers, and communications systems and structures and networks have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment.

The use of ordinals such as first, second and third does not necessarily imply a ranked sense of order, but rather may only distinguish between multiple instances of an act or structure.

Reference to portable electrical power (or energy) storage device means any device capable of storing electrical power and releasing stored electrical power including but not limited to batteries, supercapacitors or ultracapacitors. Reference to batteries means chemical storage cell or cells, for instance rechargeable or secondary battery cells including but not limited to nickel cadmium alloy or lithium ion battery cells.

The headings and Abstract of the Disclosure provided herein are for convenience only and do not interpret the scope or meaning of the embodiments.

Figure 1:
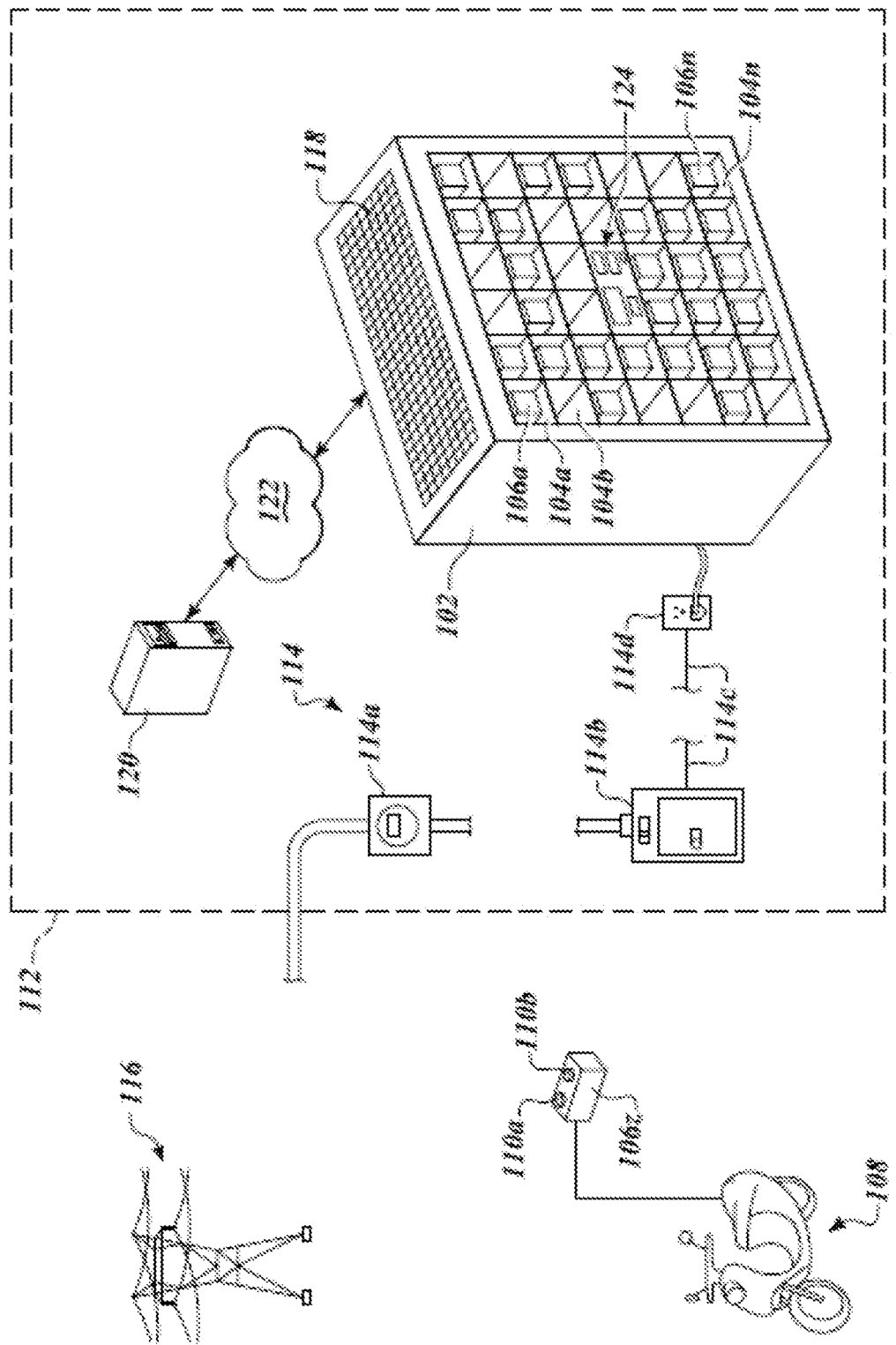
FIG. 1 is a schematic view of a collection, charging and distribution machine along with a number of electrical power storage devices according to one non-limiting illustrated embodiment, along with an electric scooter or motorbike, and an electrical service provided via an electrical grid.

FIG. 1 shows an environment 100 including a collection, charging and distribution machine 102, according to one illustrated embodiment.

The collection, charging and distribution machine 102 may take the form of a vending machine or kiosk. The collection, charging and distribution machine 102 has a plurality of receivers, compartments or receptacles 104a, 104b-104n (only three called out in FIG. 1, collectively 104) to removably receive portable electrical energy storage devices (e.g., batteries, supercapacitors or ultracapacitors) 106a-106n (collectively 106) for collection, charging and distribution. As illustrated in FIG. 1, some of the receivers 104 are empty, while other receivers 104 hold portable electrical energy storage devices 106. While FIG. 1 shows a single portable electrical energy storage device 106 per receiver 104, in some embodiments each receiver 104 may hold two or even more portable electrical energy storage devices 106. For example, each of the receivers 104 may be sufficiently deep to receive three portable electrical energy storage devices 106. Thus, for example, the collection, charging and distribution machine 102 illustrated in FIG. 1 may have a capacity capable of simultaneously holding 40, 80 or 120 portable electrical energy storage devices 106.

The portable electrical energy storage devices 106 may take a variety of forms, for example batteries (e.g., array of battery cells) or supercapacitors or ultracapacitors (e.g., array of ultracapacitor cells). For example, the portable electrical energy storage devices 106 may take the form of rechargeable batteries (i.e., secondary cells or batteries). The portable electrical energy storage devices 106 may, for instance, be sized to physically fit, and electrically power, personal transportation vehicles, such as all-electric scooters or motorbikes 108. As previously noted, combustion engine scooters and motorbikes are common in many large cities, for example in Asia, Europe and the Middle East. The ability to conveniently access charged batteries throughout a city or region may allow the use of all-electric scooters and motorbikes 108 in place of combustion engine scooters and motorbikes, thereby alleviating air pollution, as well as reducing noise.

The portable electrical energy storage devices 106 (only visible for portable electrical energy storage device 106z) may include a number of electrical terminals 110a, 110b (two illustrated, collectively 110), accessible from an exterior of the portable electrical energy storage device 106z. The electrical terminals 110 allow charge to be delivered from the portable electrical energy storage device 106z, as well as allow charge to be delivered to the portable electrical energy storage device 106z for charging or recharging the same. While illustrated in FIG. 1 as posts, the electrical terminals 110 may take any other form which is accessible from an exterior of the portable electrical energy storage device 106z, including electrical terminals positioned within slots in a battery housing.

As the portable electrical energy storage devices 106 may be lent, leased, and/or rented out to the public, it is desirable to control how and in what circumstances the portable electrical energy storage devices 106 may be charged and/or release energy, even while outside the collection, charging and distribution machine 102 or otherwise in the possession of users. Also, one or more portable charging devices 350, such as that shown in FIGS. 3A-3C, for charging one or more of the portable electrical energy storage devices 106 may be lent, leased, sold and/or rented out to the public. Thus, it is also desirable to control how and in what circumstances the portable electrical energy storage devices 106 may be charged by these portable charging devices 350 while outside the collection, charging and distribution machine 102 or otherwise in the possession of users. This control of the portable electrical energy storage devices 106 and charging thereof helps to prevent theft and/or misuse and also enables control of various performance levels of various portable electrical energy storage devices 106. Systems and methods for authentication, security and control of portable charging devices 350 and portable electrical energy storage devices 106 and also charging the portable electrical energy storage devices 106, including security systems for controlling such charging and energy release, are described in more detail below with reference to FIGS. 2-7. Such systems and methods are useful in the overall system for collection, charging and distribution of portable electrical energy storage devices 106 described herein.

In one embodiment, the collection, charging and distribution machine 102 is positioned at some location 112 at which the collection, charging and distribution machine 102 is conveniently and easily accessible by various end users. The location may take any of a large variety of forms, for example, a retail environment such as a convenience store, supermarket, gas or petrol station, or service shop. Alternatively, the collection, charging and distribution machine 102 may stand alone at a location 112 not associated with an existing retail or other business, for example in public parks or other public places. Thus, for example, collection, charging and distribution machines 102 may be located at each store of a chain of convenience stores throughout a city or region. Such may advantageously rely on the fact that convenience stores are often sited or distributed based on convenience to the target population or demographic. Such may advantageously rely on pre-existing leases on storefronts or other retail locations to allow an extensive network of collection, charging and distribution machines 102 to be quickly developed in a city or region. Quickly achieving a large network which is geographically well distributed to serve a target population enhances the ability to depend on such a system and likely commercial success of such an effort.

The location 112 may include an electrical service 114 to receive electrical power from a generating station (not shown) for example via a grid 116. The electrical service 114 may, for example, include one or more of an electrical service meter 114a, a circuit panel (e.g., circuit breaker panel or fuse box) 114b, wiring 114c, and electrical outlet 114d. Where the location 112 is an existing retail or convenience store, the electrical service 114 may be an existing electrical service, so may be somewhat limited in rating (e.g., 120 volts, 240 volts, 220 volts, 230 volts, 15 amps).

Neither the operator of the retail location 112, nor the owner, distributor or operator of the collection, charging and distribution machine 102 may wish to bear the costs of upgrading the electrical service 114. Yet, quick charging is desired in order to maintain an adequate supply of portable electrical energy storage devices 106 available for use by end users. The ability to quickly charge while maintaining existing or otherwise limited rated electrical service is addressed in U.S. provisional patent application Ser. No. 61/511,900, entitled "APPARATUS, METHOD AND ARTICLE FOR COLLECTION, CHARGING AND DISTRIBUTING POWER STORAGE DEVICES, SUCH AS BATTERIES" and filed Jul. 26, 2011.

Optionally, the collection, charging and distribution machine 102 may include or be coupled to a source of renewable electrical power. For example, where installed in an outside location the collection, charging and distribution machine 102 may include an array of photovoltaic (PV) cells 118 to produce electrical power from solar insolation. Alternatively, the collection, charging and distribution machine 102 may be electrically coupled to a microturbine (e.g., wind turbine) or PV array positioned elsewhere at the location 112, for instance on a roof top or pole mounted at a top of a pole (not shown).

The collection, charging and distribution machine 102 may be communicatively coupled to one or more remotely located computer systems, such as back end or back office systems (only one shown) 120. Also, as used herein, references to a collection machine or collection and distribution machine does not mean such a machine is limited to collection and distribution, but may also perform other functions such as charging. The back end or back office systems 120 may collect data from and/or control a plurality of collection, charging and distribution machines 102 distributed about an area, such as a city. The back end or back office systems 120 may collect data from, send data to, and/or control a plurality of portable charging devices 350 and/or portable electrical energy storage devices 106 distributed about an area, such as a city. The communications may occur over one or more communications channels including one or more networks 122, or non-networked communications channels. Communications may be over one or more wired communications channels (e.g., twisted pair wiring, optical fiber), wireless communications channels (e.g., radio, microwave, satellite, 801.11 compliant, near field communication (NFC) channels). Networked communications channels may include one or more local area networks (LANs), wide area networks (WANs), extranets, intranets, or the Internet including the Worldwide Web portion of the Internet.

The collection, charging and distribution machine 102 may include a user interface 124. The user interface may include a variety of input/output (I/O) devices to allow an end user to interact with the collection, charging and distribution machine 102. Various I/O devices are called out and described in reference to FIG. 2, which follows.

Figure 2:
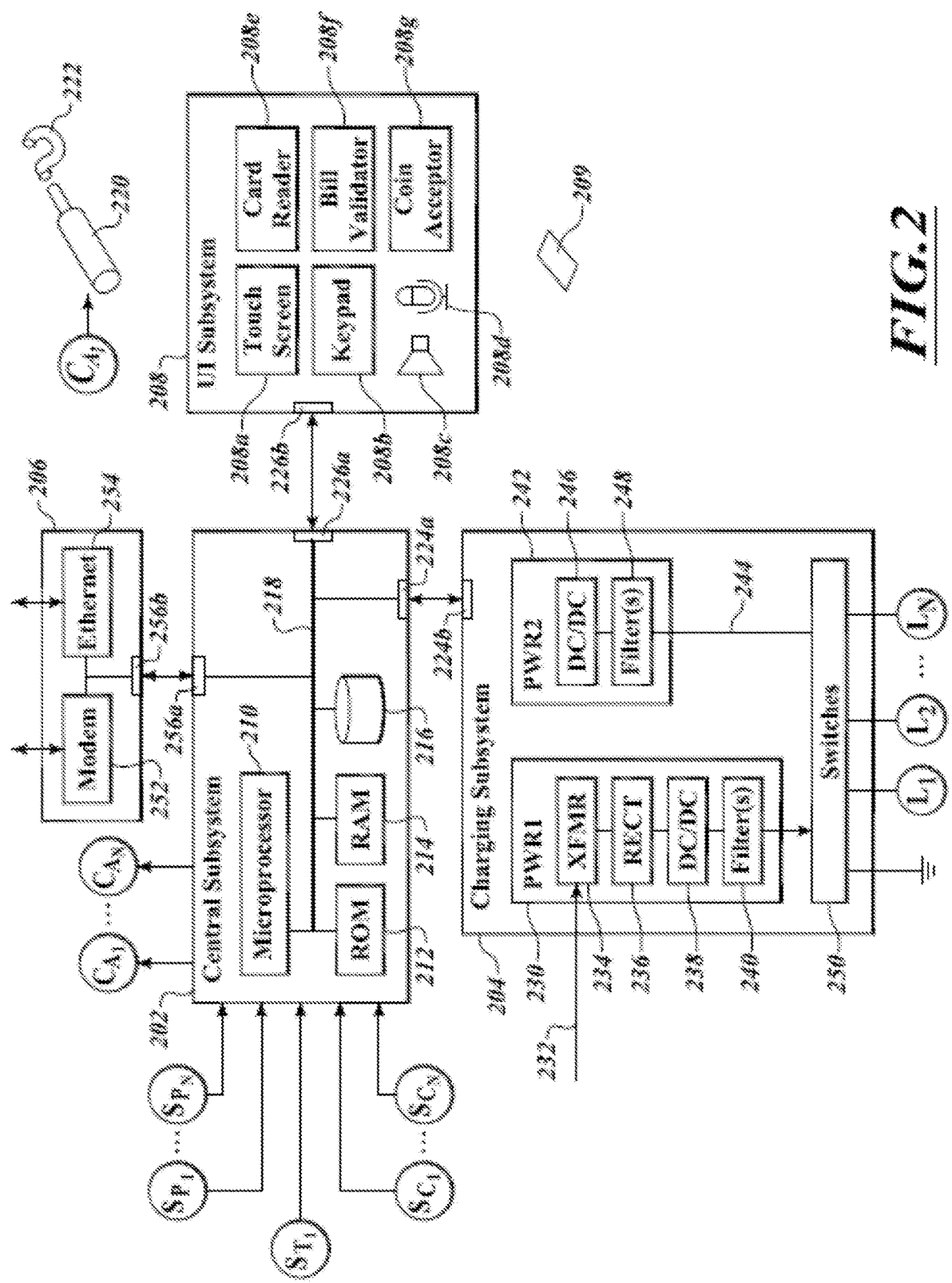
FIG. 2 is a block diagram of the collection, charging and distribution machine of FIG. 1 for collecting, charging and distribution of portable electrical energy storage devices such as those of FIG. 1, according to one non-limiting illustrated embodiment.

FIG. 2 shows the collection, charging and distribution machine 102 of FIG. 1, according to one illustrated embodiment.

The collection, charging and distribution machine 102 includes a control subsystem 202, a charging subsystem 204, a communications subsystem 206, and a user interface subsystem 208.

The control subsystem 202 includes a controller 210, for example a microprocessor, microcontroller, programmable logic controller (PLC), programmable gate array (PGA), application specific integrated circuit (ASIC) or another controller capable of receiving signals from various sensors, performing logical operations, and sending signals to various components. Typically, the controller 210 may take the form of a microprocessor (e.g., INTEL, AMD, ATOM). The control subsystem 202 may also include one or more non-transitory processor- or computer-readable storage media, for example read only memory (ROM) 212, random access memory (RAM) 214, and data store 216 (e.g., solid-state storage media such as flash memory or EEPROM, spinning storage media such as hard disk). The non-transitory processor- or computer-readable storage media 212, 214, 216 may be in addition to any non-transitory storage medium (e.g., registers) which is part of the controller 210. The control subsystem 202 may include one or more buses 218 (only one illustrated) coupling various components together, for example one or more power buses, instruction buses, data buses, etc.

As illustrated, the ROM 212, or some other one of the non-transitory processor- or computer-readable storage media 212, 214, 216, stores instructions and/or data or values for variables or parameters. The sets of data may take a variety of forms, for example a lookup table, a set of records in a database, etc. The instructions and sets of data or values are executable by the controller 110. Execution of the instructions and sets of data or values causes the controller 110 to perform specific acts to cause the collection, charging and distribution machine 102 to collect, charge, and distribute portable energy storage devices. Specific operation of the collection, charging and distribution machine 102 is described herein and in the context of being a portable charging device 350 to charge the portable electrical energy storage devices 106.

The controller 210 may use RAM 214 in a conventional fashion, for volatile storage of instructions, data, etc. The controller 210 may use data store 216 to log or retain information, for example telemetric information related to collection, charging and/or distribution or collection of the portable electric power storage devices 106 and/or operation of the collection, charging and distribution machine 102 itself. The instructions are executable by the controller 210 to control operation of the collection, charging and distribution machine 102 in response to end user or operator input, and using data or values for the variables or parameters.

The control subsystem 202 receives signals from various sensors and/or other components of the collection, charging and distribution machine 102 which include information that characterizes or is indicative of operation, status, or condition of such other components. Sensors are represented in FIG. 2 by the letter S appearing in a circle along with appropriate subscript letters.

For example, one or more position sensors $S_{P1}$-$S_{PN}$ may detect the presence or absence of portable electrical power storage device 106 at each of the receivers 104. The position sensors $S_{P1}$-$S_{PN}$ may take a variety of forms. For example, the position sensors $S_{P1}$-$S_{PN}$ may take the form of mechanical switches that are closed, or alternatively opened, in response to contact with a portion of a respective portable electrical power storage device 106 when the portable electrical power storage device 106 is inserted into the receiver 104. Also for example, the position sensors $S_{P1}$-$S_{PN}$ may take the form of optical switches (i.e., optical source and receiver) that are closed, or alternatively opened, in response to contact with a portion of a respective portable electrical power storage device 106 when the portable electrical power storage device 106 is inserted into the receiver 104. Also for example, the position sensors $S_{P1}$-$S_{PN}$ may take the form of electrical sensors or switches that are closed, or alternatively opened, in response to detecting a closed circuit condition created by contact with the terminals 110 of a respective portable electrical power storage device 106 when the portable electrical power storage device 106 is inserted into the receiver 104, or an open circuit condition that results from the lack of a respective portable electrical power storage device 106 in the receiver 104. These examples are intended to be non-limiting, and it is noted that any other structures and devices for detecting the presence/absence or even the insertion of the portable electrical power storage devices 106 into receivers may be employed.

For example, one or more charge sensors $S_{C1}$-$S_{CN}$ may detect charge of the portable electrical power storage devices 106 at each of the receivers 104. Charge sensors $S_{C1}$-$S_{CN}$ may detect the amount of charge stored by the portable electrical power storage devices 106. Charge sensors $S_{C1}$-$S_{CN}$ may additionally detect an amount of charge and/or rate of charging being supplied to ones of the portable electrical power storage devices 106 at each of the receivers 104. Such may allow assessment of current (i.e., temporal) charge condition or status of each portable electrical power storage device 106, as well as allow feedback control over charging of same, including control over rate of charging. Charge sensors $S_{C1}$-$S_{CN}$ may include any variety of current and/or voltage sensors.

For example, one or more charge sensors $S_{T1}$ (only one shown) may detect or sense a temperature at the receivers 104 or in the ambient environment.

The control subsystem 202 provides signals to various actuators and/or other components responsive to control signals, which signals include information that characterizes or is indicative of an operation the component is to perform or a state or condition in which the components should enter. Control signals, actuators or other components responsive to control signals are represented in FIG. 2 by the letter C appearing in a circle along with appropriate subscript letters.

For example, one or more engine control signals $C_{A1}$-$C_{AN}$ may affect the operation of one or more actuators 220 (only one illustrated). For instance, a control signal $C_{A1}$ may cause movement of an actuator 220 between a first and a second position or change a magnetic field produced by the actuator 220. The actuator 220 may take any of a variety of forms, including but not limited to a solenoid, an electric motor such as a stepper motor, or an electromagnet. The actuator 220 may be coupled to operate a latch, lock or other retainer mechanism 222. The latch, lock or other retainer mechanism 222 may selectively secure or retain one or more portable electrical power storage devices 106 (FIG. 1) in the receiver 104 (FIG. 1). For instance, the latch, lock or other retainer mechanism 222 may physically couple to a complimentary structure that is part of a housing of the portable electrical power storage devices 106 (FIG. 1). Alternatively, the latch, lock or other retainer mechanism 222 may magnetically couple to a complimentary structure that is part of a housing of the portable electrical power storage devices 106 (FIG. 1). Also for instance, the latch, lock or other mechanism may open a receiver 104 (FIG. 1), or may allow a receiver 104 to be opened, to receive a partially or fully discharged portable electrical power storage device 106 for charging. For example, the actuator may open and/or close a door to the receiver 104 (FIG. 1), to selectively provide access to a portable electrical power storage device 106 (FIG. 1) received therein. Also for example, the actuator may open and/or close a latch or lock, allowing an end user to open and/or close a door to the receiver 104 (FIG. 1), to selectively provide access to a portable electrical power storage device 106 (FIG. 1) received therein.

The control subsystem 202 may include one or more ports 224a to provide control signals to one or more ports 224b of the charging subsystem 206. The ports 224a, 224b may provide bi-directional communications. The control subsystem 202 may include one or more ports 226a to provide control signals to one or more ports 226b of the user interface subsystem 208. The ports 226a, 226b may provide bi-directional communications.

The charging subsystem 204 includes various electrical and electronic components to charge portable electrical power storage devices 106 when positioned or received in the receivers 104. For example, the charging subsystem 204 may include one or more power buses or power bus bars, relays, contactors or other switches (e.g., insulated gate bipolar transistors or IGBTs, metal oxide semiconductor transistors or MOSFETs), rectifier bridge(s), current sensors, ground fault circuitry, etc. The electrical power is supplied via contacts that can take any of a variety of forms, for instance terminals, leads, posts, etc. The contacts allow electrical coupling of various components. Some possible implementations are illustrated in FIG. 2. Such is not intended to be exhaustive. Additional components may be employed while other components may be omitted.

The illustrated charging subsystem 204 includes a first power converter 230 that receives electrical power from the electrical service 114 (FIG. 1) via a line or cord 232. The power will typically be in the form of single, two or three phase AC electrical power. As such, the first power converter 230 may need to convert and otherwise condition the electrical power received via the electrical services 114 (FIG. 1), for example for rectifying an AC waveform to DC, transforming voltage, current, phase, as well as reducing transients and noise. Thus, the first power converter 230 may include a transformer 234, rectifier 236, DC/DC power converter 238, and filter(s) 240.

The transformer 234 may take the form of any variety of commercially available transformers with suitable ratings for handling the power received via the electrical service 114 (FIG. 1). Some embodiments may employ multiple transformers. The transformer 234 may advantageously provide galvanic isolation between the components of the collection, charging and distribution machine 102 and the grid 116 (FIG. 1). The rectifier 236 may take any of variety of forms, for example a full bridge diode rectifier or a switch mode rectifier. The rectifier 236 may be operated to transform AC electrical power to DC electrical power. The DC/DC power converter 238 may be any of a large variety of forms. For example, DC/DC power converter 238 may take the form a switch mode DC/DC power converter, for instance employing IGBTs or MOSFETs in a half or full bridge configuration, and may include one or more inductors. The DC/DC power converter 238 may have any number of topologies including a boost converter, buck converter, synchronous buck converter, buck-boost converter or fly-back converter. The filter(s) 240 may include one or more capacitors, resistors, Zener diodes or other elements to suppress voltage spikes, or to remove or reduce transients and/or noise.

The illustrated charging subsystem 204 may also receive electrical power from a renewable power source, for example the PV array 118 (FIG. 1). Such may be converted or conditioned by the first power converter 230, for example being supplied directly to the DC/DC power converter 238, bypassing the transformer 236 and/or rectifier 236. Alternatively, the illustrated charging subsystem 204 may include a dedicated power converter to convert or otherwise condition such electrical power.

The illustrated charging subsystem 204 may optionally include second power converter 242 that receives electrical power from one or more portable electrical power storage devices 106 (FIG. 1) via one or more lines 244, for charging other ones of the portable electrical power storage devices 106. As such, the second power converter 242 may need to convert and/or otherwise condition the electrical power received from portable electrical power storage devices 106, for example optionally transforming voltage or current, as well as reducing transients and noise. Thus, the second power converter 242 may optionally include a DC/DC power converter 246 and/or filter(s) 248. Various types of DC/DC power converters and filters are discussed above.

The illustrated charging subsystem 204 includes a plurality of switches 250 responsive to the control signals delivered via ports 224a, 224b from the control subsystem 202. The switches may be operable to selectively couple a first number or set of portable electrical power storage devices 106 to be charged from electrical power supplied by both the electrical service via the first power converter 230 and from electrical power supplied by a second number or set of portable electrical power storage devices 106. The first number or set of portable electrical power storage devices 106 may include a single portable electrical power storage device 106, two, or even more portable electrical power storage devices 106. The second number or set of portable electrical power storage devices 106 may include a single portable electrical power storage device 106, two, or even more portable electrical power storage devices 106. The portable electrical power storage devices 106 are represented in FIG. 2 as loads $L_1$, $L_2$-$L_N$.

The communications subsystem 206 may additionally include one or more communications modules or components which facilitate communications with the various components of a back end or back office system 120 (FIG. 1) and/or various components of the portable electrical power storage devices 106. The communications subsystem 206 may, for example, include one or more modems 252 or one or more Ethernet or other types of communications cards or components 254. A port 256a of the control subsystem 202 may communicatively couple the control subsystem 202 with a port 256b of the communications subsystem 206. The communications subsystem 206 may provide wired and/or wireless communications. For example, the communications subsystem 206 may provide components enabling short range (e.g., via Bluetooth, near field communication (NFC), radio frequency identification (RFID) components and protocols) or longer range wireless communications (e.g., over a wireless LAN, satellite, or cellular network) with various other devices external to the collection, charging and distribution machine 102, including the portable electrical energy storage devices 106. The communications subsystem 206 may include one or more ports, wireless receivers, wireless transmitters or wireless transceivers to provide wireless signal paths to the various remote components or systems. The remote communications subsystem 206 may include one or more bridges or routers suitable to handle network traffic including switched packet type communications protocols (TCP/IP), Ethernet or other networking protocols.

The user interface system 208 includes one or more user input/output (I/O) components. For example, user interface system 208 may include a touch screen display 208a, operable to present information and a graphical user interface (GUI) to an end user and to receive indications of user selections. The user interface system 208 may include a keyboard or keypad 208b, and/or a cursor controller (e.g., mouse, trackball, trackpad) (not illustrated) to allow an end user to enter information and/or select user selectable icons in a GUI. The user interface system 208 may include a speaker 208c to provide aural messages to an end user and/or a microphone 208d to receive spoken user input such as spoken commands.

The user interface system 208 may include a card reader 208e to read information from card type media 209. The card reader 208e may take a variety of forms. For instance, the card reader 208e may take the form of, or include, a magnetic stripe reader for reading information encoded in a magnetic stripe carried by a card 209. For instance, the card reader 208e may take the form of, or include, a machine-readable symbol (e.g., barcode, matrix code) card reader for reading information encoded in a machine-readable symbol carried by a card 209. For instance, the card reader 208e may take the form of, or include, a smart card reader for reading information encoded in a non-transitory medium carried by a card 209. Such may, for instance, include media employing radio frequency identification (RFID) transponders or electronic payment chips (e.g., near filed communications (NFC) chips). Thus, the card reader 208e may be able to read information from a variety of card media 209, for instance credit cards, debit cards, gift cards, prepaid cards, as well as identification media such as drivers licenses. The card reader 208e may also be able to read information encoded in a non-transitory medium carried by the portable electrical energy storage devices 106, and may also include RFID transponders, transceivers, NFC chips and/or other communication devices to communicate information to the portable electrical energy storage devices 106 (e.g., for authentication of the portable electrical energy storage devices 106 and/or authentication of the collection, charging and distribution machine 102 to the portable electrical energy storage devices 106).

The user interface system 208 may include a bill acceptor 208f and a validator and/or coin acceptor 208g to accept and validate cash payments. Such may be highly useful in servicing populations who lack access to credit. Bill acceptor and validator 208f and/or coin acceptor 208g may take any variety of forms, for example those that are currently commercially available and used in various vending machines and kiosks.

Figure 3A:
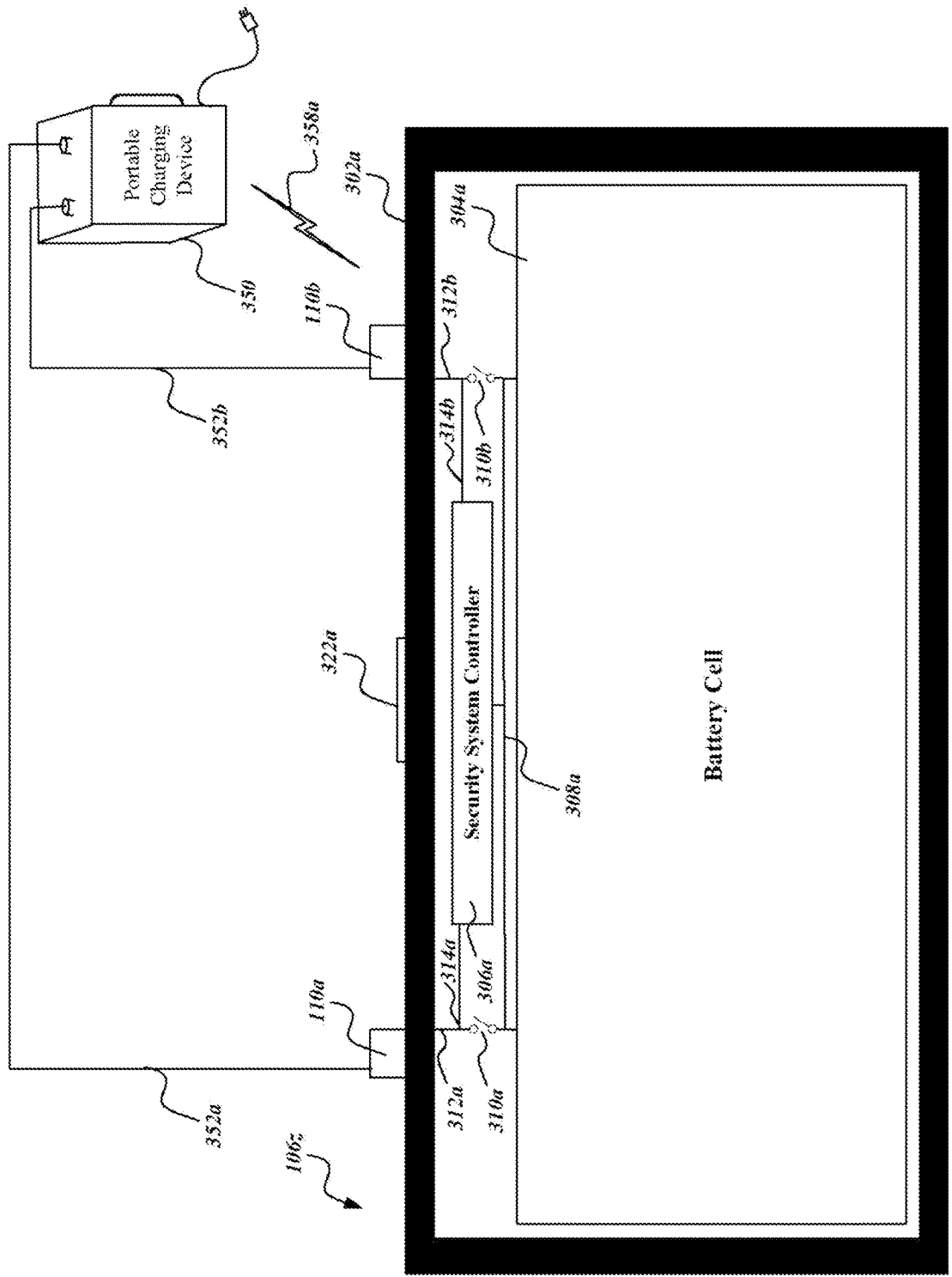
FIG. 3A is a block diagram of a portable electrical energy storage device of FIG. 1 connected to and in communication with a portable charging device, according to one non-limiting illustrated embodiment.

FIG. 3A is a block diagram of the portable electrical energy storage device 106z of FIG. 1 connected to and in communication with a portable charging device 350, according to one non-limiting illustrated embodiment.

Shown is a portable electrical energy storage device housing 302a, electrical terminals 110a, 110b, a battery cell 304a, security system controller 306a, and a secure access panel 322a. The battery cell 304a is any rechargeable type of electrochemical cell that converts stored chemical energy into electrical energy. The electrical terminals 110a, 110b are accessible from an exterior of the portable electrical energy storage device 106z. The electrical terminals 110 allow electrical current to be delivered from the portable electrical energy storage device 106z, as well as allow charge to be delivered to the portable electrical energy storage device 106z via corresponding electrical power connections 352a and 352b for charging or recharging the same through conductive terminal connections 312a and 312b to the battery cell 304a. While illustrated in FIG. 3A as posts, the electrical terminals 110a and 110b may take any other form which is accessible from an exterior of the portable electrical energy storage device 106z, including electrical terminals positioned within slots in the battery housing 302a.

Operably coupled to terminal lines 312a and 312b and the security system controller 308a are two switches 310a and 310b electronically controlled by the security system controller 306a. In a closed position, the switches 310a and 310b operate to complete a circuit allowing electrical current to flow from the portable electrical energy storage device 106z, or to be delivered to the portable electrical energy storage device 106z from the portable charging device 350. In an open position, the switches 310a and 310b operate to break the circuit, preventing electrical current from flowing from and preventing electrical current from being delivered to the portable electrical energy storage device 106z. In some embodiments, the switches 310a and 310b may be any type of electronic or electromechanical switch responsive to signals received from the security system controller 308a. The switches 310a and 310b may include various electrical and/or electronic components including various types of actuators, contacts, relays, rectifiers, power transistors, IGBTs, and/or MOSFETs, etc.

In some embodiments, the portable electric storage device 106z is by default in a state where it cannot accept a charge and/or discharge (or otherwise provide electrical current) unless it receives authentication from the portable charging device 350 or other external device (e.g., via a wireless signal). For example, such authentication may be made based on information received via components of the portable electrical energy storage device 106z and/or the portable charging device 350 enabling short range (e.g., via Bluetooth, near field communication (NFC), radio frequency identification (RFID) components and protocols) or longer range wireless communications (e.g., over a wireless LAN, satellite, or cellular network) with various other devices external to the portable electric storage device 106z and/or portable charging device 350. The information received on which the authentication may be based includes, but is not limited to, information regarding one or more of: a code; a password; electronic credentials; electronic security certificate; encrypted data; encryption key; electronic key; user account identification; cluster identification of various devices external to the portable electrical energy storage device 106z and/or portable charging device 350; user identification; portable electrical energy storage device 106z and/or portable charging device 350 identification; vehicle identification; a key fob; a security token; a user mobile device; detected unauthorized previous charging or discharging of battery; detected unauthorized previous charging or discharging of battery; identification of a user mobile device; identification of a vehicle associated with a user, a user account, a mobile device of the user, the portable electrical energy storage device 106z and/or the portable charging device 350, etc.

In one embodiment, the pesd is prevented from discharging if the battery voltage/charge of the pesd was increased without authorization. For example, if the security system controller 306a detects the charge level of the pesd increasing, but the security system controller 306a for the pesd did not perform or detect that an applicable authentication procedure was performed before this detected increase, the security system controller 306a will cause the pesd to automatically put the pesd in a "locked" mode which prevents the pesd from discharging. This may prevent a user from charging the pesd with an unauthorized charger. NFC may be used as a communication channel over which the authorization procedure is performed between the pesd and an external device and/or over which a signal to lock and/or unlock the pesd is communicated between the pesd and an external device. In some embodiments, the signal to lock and unlock the pesd may be sent as part of or as a result of the applicable authentication procedure being performed.

The security system controller 306a is configured to send a signal to open or close the switches 310a and 310b based on an authentication from a portable charging device 350 to which the portable electrical energy storage device 106z is to be connected to receive a charge. The portable electric storage device security system controller 306a may also be configured to regulate the amount of energy or current to receive from the portable charging device 350, if any, such as when both switches 310a and 310b are in the open position, via regulating current flowing through the portable electric storage device security system controller 306a on lines 314a and 314b coupled to the terminals 110a and 110b and to the portable electric storage device security system controller 306a, and through line 308a coupled to the portable electric storage device security system controller 306a and the battery cell.

The regulation of the amount of energy or current to receive from the portable charging device 350, if any, may be in response to various information or other wireless signals (e.g., including authentication information) from devices external to the portable electric storage device 106z. Also, in some instances, a user may select a power level, performance level, or a capacity of the portable electric storage device 106z on an interface of the portable charging device 350 when attempting to charge the portable electrical energy storage device 106z using the portable charging device 350. This information may be communicated to the security system controller 306b of the portable charging device 350 (shown in FIGS. 3B and 3C) and/or to the security system controller 306a of the portable electrical energy storage device 106z for verification or authentication of this information. This information may then be used by the security system controller 306b of the portable charging device 350 (shown in FIGS. 3B and 3C) and/or the security system controller 306a of the portable electrical energy storage device 106z in setting a charge level, electrical current level, electrical current type, and/or charge time for the portable electrical energy storage device 106z.

Also, the amount of energy released by the portable charging device 350 and/or an amount of charge accepted from the portable charging device 350 for charging the portable electrical energy storage device 106z, if any, may depend or be based on one or more of the following, which may be indicated by information received by the portable electric storage device security system controller 306a, from the portable charging device 350 and/or other external device or system (e.g., back end system 122): a type of portable electrical energy storage device; a user profile; a vehicle profile of a user; the subscription level of the user; particular promotions being offered related to the identified user or to general users; demographic information of the user such as, but not limited to: income level, gender, age, net worth, size, weight, marital status, etc.); a password; electronic credentials; electronic security certificate; encrypted data; encryption key; electronic key; user account identification; cluster identification of various devices external to the portable electrical energy storage device 106z and/or portable charging device 350; user identification; portable electrical energy storage device 106z and/or portable charging device 350 identification; vehicle identification; a key fob; a security token; a user mobile device; identification of a user mobile device; identification of a vehicle associated with a user, a user account, a mobile device of the user, the portable electrical energy storage device 106z and/or the portable charging device 350.

In one example, when the portable electrical energy storage device 106z comes within a certain wireless radio communication range of the portable charging device 350, the security system controller 306a of the portable electrical energy storage device 106z will either query the portable charging device 350 or receive a query from the portable charging device 350 using wireless signal 358a for purposes of sending information to and/or or receiving information from the portable charging device 350 to authenticate the portable charging device 350. The security system controller 306a will then authenticate the portable charging device 350 based on this information.

In some embodiments, this wireless signal 358a includes an NFC signal between the portable electrical energy storage device 106z and the portable charging device 350. Verification or authentication of such information may additionally or instead be made in conjunction with or via communication with a back end system 120 (shown in FIG. 1 and FIG.

3B). For example, this verification may include sending received user credential and/or other or authentication information (e.g., authentication information received from portable charging device 350) to the back end system 120 for verification or authentication of the portable charging device 350, a user associated with the portable charging device 350 and/or portable electrical energy storage device 106z. In other embodiments, the portable charging device 350 and/or portable electrical energy storage device 106z may have a key or code stored within secure storage with which the portable electrical energy storage device 106z may compare, verify, match, derive or reconcile corresponding security or authentication information stored by or received by the security system controller 306a.

Once the portable charging device 350 and/or portable electrical energy storage device 106z are authenticated, the security system controller 306a enables the portable electrical energy storage device 106z to accept a charge, or accept a level or amount of current from the portable charging device 350 as described above. In some embodiments, the security system controller 306a enables the portable electrical energy storage device 106z to accept a charge, or accept a level or amount of current from the portable charging device 350 by sending a signal to the portable charging device 350 which enables the portable charging device 350 to deliver a charge to the portable electrical energy storage device 106z.

In one embodiment, the security system controller 306b of the portable charging device 350 and/or the security system controller 306a of the portable electrical energy storage device 106z may track the number of charge cycles provided, total power delivered over a time period, time used, etc., regarding the portable charging device 350 and/or other authenticated portable charging devices, and store or communicate this information as data to the back end system 120 via network 122 (shown in FIG. 1 and FIG. 3A). This may be for purposes of, cause and/or enable obtaining or delivering revenue associated with use of the portable electrical energy storage device 106z, use of the portable charging device 350 and/or use of power provided by the portable electrical energy storage device 106z and/or the portable charging device 350 to particular users and/or particular portable electrical energy storage devices. In one embodiment, such tracking information is transferred from the portable electrical energy storage device 106z to the collection, charging and distribution machine 102 once the portable electrical energy storage device 106z is returned to the collection, charging and distribution machine 102. This may be accomplished via a physical connection that is made between the portable electrical energy storage device 106z and the collection, charging and distribution machine 102 that enables communication between the security system controller 306a of the portable electrical energy storage device 106z and the collection, charging and distribution machine 102 when the portable electrical energy storage device 106z is placed in the collection, charging and distribution machine 102 for charging, exchange, etc. This communication of tracking data and authentication data may also or instead be performed by wireless communication between the security system controller 306a of the portable electrical energy storage device 106z and the collection, charging and distribution machine 102, wireless communication between the security system controller 306a and the back end system 102 and/or the wireless communication between the security system controller 306a and vehicle 108.

In one embodiment, such tracking information is transferred from the portable charging device 350 to the collection, charging and distribution machine 102 once portable charging device 350 is returned to, is connected to, or comes within wireless communication range of the collection, charging and distribution machine 102. This may be accomplished via a physical connection that is made between the portable charging device 350 and the collection, charging and distribution machine 102 that enables communication between the security system controller 306b of the portable charging device 350 and the collection, charging and distribution machine 102 when the portable charging device 350 is connected (wirelessly or otherwise) to the collection, charging and distribution machine 102. This communication of tracking data and authentication data may also or instead be performed by wireless communication between the security system controller 306b of the portable charging device 350 and the collection, charging and distribution machine 102, wireless communication between the security system controller 306b of the portable charging device 350 and the back end system 102 and/or wireless communication between the security system controller 306b of the portable charging device 350 and vehicle 108.

The housing 302a is constructed of a polymer or other durable material of sufficient thickness to protect the battery cell 304a and portable electric storage device security system controller 306a from outside elements and tampering. For example the walls of the housing may be at least approximately 0.25 inch thick and completely surround the battery cell 304a and portable electric storage device security system controller 306a (except for in some embodiments a small vent hole in the housing) such that the battery cell 304a and portable electric storage device security system controller 306a cannot be accessed without a key or other specialized tool to open a locked access panel 322a.

One or more portions of the security system controller 306a may be constructed to be either tamper-proof, tamper resistant, or tamper indicative. For example, one or more portions may be frangible, and designed to render an open circuit in response to tampering or attempted tampering. For instance, one or more switches 310 or electrical leads, traces, or conductive paths may be formed in a frangible substrate, which breaks in response to tampering. The frangible substrate may take any of a large variety of forms including glasses, ceramics, or even more traditional circuit board materials if suitably thin as to tear, rip, or break if subject to forces associated or expected to be applied if tampered. In some instances, it may be sufficient if the electrical lead, trace, or conductive path is frangible, while the substrate (e.g., circuit board, housing 202) is not frangible. For instance, such may be accomplished where the substrate is sufficiently complaint that the substrate will bend without breaking, while the bending causes a discontinuity to occur in the electrical path. Alternatively, a structure such as a blade or knife may be triggered by attempted tampering, to sever the electrical path, resulting in an open circuit condition which renders the portable electrical energy storage device 106z inoperable.

The housing 302a may provide a protection to prevent or deter tampering, and may be formed of suitably strong and resilient materials (e.g., ABS plastic). Such may not only prevent or deter tampering, but may leave a visible indication of any tampering attempts. For example, the housing 302a may include a strong outer layer of a first color (e.g., black) within an inner layer of a second color (e.g., fluorescent orange) there beneath. Such will render attempts to cut through the housing 302a visibly apparent.

It is also noted that the housing 302a may serve as the aforementioned substrate, or a frangible substrate may be secured to an inner portion of the housing, for instance, via suitable adhesives. Thus, tampering with the housing may break or damage a circuit connection, again rendering the device inoperable.

In some embodiments, some or all of the components of the portable electric storage device security system controller 306a may be located outside of the portable electric storage device 106z as a separate device that actuates the switches 310a and 310b (e.g., via a wireless control signal). Also additional or fewer switches may be used sufficient to prevent or allow the flow of current to and from the battery cell 304a.

FIG. 3B is a block diagram of a portable charging device 350 connected to portable charging device 350 and in communication with the back end or back office system 120 of FIG. 1, according to one non-limiting illustrated embodiment.

Shown is a portable charging device housing 302b, electrical terminals 110c, 110d, a portable charging device power source 304b, security system controller 306a, and a secure access panel 322b. The portable charging device power source 304b is any rechargeable type of electrochemical cell that stores and converts stored chemical energy into electrical energy to provide power for charging portable electrical energy storage devices, such as portable electrical energy storage device 106z. In this example embodiment, portable electrical energy storage device 106z may or may not include the security system controller 306a of portable electrical energy storage device 106z shown in FIG. 3A, or include a security system controller 306a with all the functionality of security system controller 306a as otherwise described herein in various embodiments.

The electrical terminals 110c, 110d may be accessible from an exterior of the portable charging device 350. The electrical terminals 110 allow charge to be delivered from the portable charging device 350, as well as allow charge to be delivered to the portable electrical energy storage device 106z via corresponding electrical power connections 352a and 352b for charging or recharging the same via conductive terminal connections 312c and 312d to the portable charging device power source 304b. While illustrated in FIG. 3B as posts, the electrical terminals 110c and 110d may take any other form which is accessible from an exterior of the portable charging device 350, including electrical terminals positioned within slots in the portable charging device housing 302b.

Operably coupled to terminal lines 312c and 312d and the security system controller 306b are two switches 310c and 310d electronically controlled by the security system controller 306a. In a closed position, the switches 310c and 310d operate to complete a circuit allowing electrical current to flow from the portable charging device 350, or to be delivered to the portable electrical energy storage device 106z from the portable charging device 350. In an open position, the switches 310c and 310d operate to break the circuit, preventing electrical current from flowing from and preventing electrical current from being delivered to the portable electrical energy storage device 106z. In some embodiments, the switches 310c and 310d may be any type of electronic or electromechanical switch responsive to signals received from the security system controller 306b. The switches 310c and 310d may include various electrical and/or electronic components including various types of actuators, contacts, relays, rectifiers, power transistors, IGBTs, and/or MOSFETs, etc.

In some embodiments, the portable charging device 350 is by default in a state where it cannot provide a charge unless it receives authentication from the portable electrical energy storage device (e.g., via a wireless signal). For example, such authentication may be made based on information received via components of the portable electrical energy storage device 106z and/or the portable charging device 350 enabling short range (e.g., via Bluetooth, near field communication (NFC), radio frequency identification (RFID) components and protocols) or longer range wireless communications (e.g., over a wireless LAN, satellite, or cellular network) with various other devices external to the portable electric storage device 106z and/or portable charging device 350. The information received on which the authentication may be based includes, but is not limited to, information regarding one or more of: a code; a password; electronic credentials; electronic security certificate; encrypted data; encryption key; electronic key; user account identification; cluster identification of various devices external to the portable electrical energy storage device 106z and/or portable charging device 350; user identification; portable electrical energy storage device 106z and/or portable charging device 350 identification; vehicle identification; a key fob; a security token; a user mobile device; identification of a user mobile device; identification of a vehicle associated with a user, a user account, a mobile device of the user, the portable electrical energy storage device 106z and/or the portable charging device 350, etc.

The security system controller 306b is configured to send a signal to open or close the switches 310c and 310d based on an authentication from the portable electric storage device 106z which is to be connected to the portable charging device 350 to receive a charge from the portable charging device 350. The security system controller 306b is also configured to regulate the amount of energy or current to provide from the portable charging device 350, if any, when both switches 310c and 310d are in the open position, via regulating current flowing through the portable electric storage device security system controller 306a on lines 314c and 314d coupled to the terminals 110c and 110d and the security system controller 306b, and line 308b coupled to the portable security system controller 306b and the portable charging device power source 304b. The regulation of the amount of energy or current to receive from the portable charging device 350, if any, may be in response to various information or other wireless signals (e.g., including authentication information) from devices external to the portable charging device 350. Also, in some instances, a user may select a power level, performance level, or a capacity of the portable electric storage device 106z on an interface of the portable charging device 350 when attempting to charge the portable electrical energy storage device 106z using the portable charging device 350. This information may be communicated to the security system controller 306b of the portable charging device 350 and/or to the security system controller 306a of the portable electrical energy storage device 106z for verification or authentication of this information and used in setting a charge level, electrical current level, electrical current type, and/or charge time for the portable electrical energy storage device 106z.

Also, the amount of energy released by the portable charging device 350 and/or an amount of charge accepted from the portable charging device 350 for charging the portable electrical energy storage device 106z, if any, may depend on one or more of the following as indicated by information received by the portable electric storage device security system controller 306a, from the portable charging device 350 or other external device or system (e.g., back end system 122): a type of portable electrical energy storage device; a user profile; a vehicle profile of a user; the subscription level of the user; particular promotions being offered related to the identified user or to general users; demographic information of the user such as, but not limited to: income level, gender, age, net worth, size, weight, marital status, etc.); a password; electronic credentials; electronic security certificate; encrypted data; encryption key; electronic key; user account identification; cluster identification of various devices external to the portable electrical energy storage device 106z and/or portable charging device 350; user identification; portable electrical energy storage device 106z and/or portable charging device 350 identification; vehicle identification; a key fob; a security token; a user mobile device; identification of a user mobile device; identification of a vehicle associated with a user, a user account, a mobile device of the user, the portable electrical energy storage device 106z and/or the portable charging device 350.

In one example, when the portable electrical energy storage device 106z comes within a certain wireless radio communication range of the portable charging device 350, the security system controller 306b of the will either query the portable electrical energy storage device 106z or receive a query from the portable electrical energy storage device 106z using wireless signal 358a for purposes of sending information to and/or or receiving information from the portable electrical energy storage device 106z to authenticate the portable electrical energy storage device 106z. The security system controller 306b will then authenticate the portable electrical energy storage device 106z based on this information. In some embodiments, this wireless signal is an NFC signal between the portable electrical energy storage device 106z and the portable charging device 350. Verification or authentication of such information may additionally or instead be made via communication with a back end system 120 (shown in FIG. 1 and FIG. 3B). This verification may include sending received user credential and/or other or authentication information (e.g., authentication information received from portable electrical energy storage device 106z) to the back end system 120 for verification or authentication of the portable electrical energy storage device 106z and/or a user associated with the portable electrical energy storage device 106z and/or portable charging device 350. In other embodiments, the portable charging device 350 and/or portable electrical energy storage device 106z may have a key or code stored within secure storage with which the portable charging device 350 may compare, verify, match, derive or reconcile corresponding security or authentication information stored by or received by the security system controller 306b. Once the portable charging device 350 and/or portable electrical energy storage device 106z are authenticated, the security system controller 306b enables the portable charging device 350 to provide a charge, or provide a level or amount of current from the portable charging device 350 as described above.

The portable charging device 350 may include one or more components, structures, functionality and/or features of the collection, charging and distribution machine 102 and/or the charging system of the collection, charging and distribution machine 102 described herein. For example, the portable charging device 350 may include one or more components of the charging subsystem 204, the central subsystem 202 and/or the user interface (UI) subsystem 208 of the collection, charging and distribution machine 102 in order to implement in the portable charging device 350, as applicable, the same or similar functionality as that of the collection, charging and distribution machine 102. This includes, but is not limited to the capability to communicate to the back end system 102 regarding usage, charging, identification, tracking usage, etc., of the portable charging device 350 and/or the portable electrical energy storage device 106z; the ability to charge the portable electrical energy storage device 106z according to the type of portable electrical energy storage device 106z or other criteria; the ability to identify the portable electrical energy storage device 106z; the ability to control, time and/or or regulate the power, current or level of charge provided by the portable charging device 350 to the portable electrical energy storage device 106z; the ability to identify a user associated with the portable electrical energy storage device 106z to enable authentication and/or setting charging configurations as described herein, the ability to identify a vehicle or mobile device associated with the user enable authentication and/or setting charging configurations as described herein, etc.

For example, in one embodiment, the security system controller 306b of the portable charging device 350 and/or the security system controller 306a of the portable electrical energy storage device 106z may track the number of charge cycles provided, total power delivered over a time period, time the portable charging device 350 is used, etc., regarding the portable charging device 350 and/or other authenticated portable charging devices. The security system controller 306b of the portable charging device 350 and/or the security system controller 306a of the portable electrical energy storage device 106z may then store or communicate this information as data to the back end system 120 via network 122 (shown in FIG. 1 and FIG. 3A) and/or other external devices or systems. This may be for purposes of obtaining revenue associated with use of the portable electrical energy storage device 106z, use of the portable charging device 350 and/or use of power provided by the portable electrical energy storage device 106z and/or the portable charging device 350 to particular users and/or particular portable electrical energy storage devices.

In one embodiment, such tracking information is transferred from the portable charging device 350 to the collection, charging and distribution machine 102 once portable charging device 350 is returned to, is connected to, or comes within wireless communication range of the collection, charging and distribution machine 102. This may be accomplished via a wired or wireless connection that is made between the portable charging device 350 and the collection, charging and distribution machine 102 that enables communication between the security system controller 306b of the portable charging device 350 and the collection, charging and distribution machine 102 when the portable charging device 350 is connected (wirelessly or otherwise) to the collection, charging and distribution machine 102. This communication of tracking data and authentication data may also or instead be performed by wireless communication between the security system controller 306b of the portable charging device 350 and the collection, charging and distribution machine 102, wireless communication between the security system controller 306b of the portable charging device 350 and the back end system 102 (e.g., via communication link 358c and/or via communication network 122), and/or wireless communication between the security system controller 306b and vehicle 108 (e.g., via communication link 358e shown in FIG. 3C).

The housing 302b is constructed of a polymer or other durable material of sufficient thickness to protect the portable charging device power source 304b and security system controller 306b from outside elements and tampering. For example the walls of the housing may be at least approximately 0.25 inch thick and completely surround the portable charging device power source 304b and portable electric storage device security system controller 306b (except for in some embodiments a small vent hole in the housing) such that the portable charging device power source 304b and portable charging device security system controller 306b cannot be accessed without a key or other specialized tool to open a locked access panel 322b. In some embodiments, the portable charging device 350 may include a power cable 360 to directly provide power received via the power cable 360 to charge the portable electrical energy storage device 106z and/or charge the portable charging device power source 304b, which in turn provides power to charge the portable electrical energy storage device 106z.

One or more portions of the security system controller 306b may be constructed to be either tamper-proof, tamper resistant, or tamper indicative. For example, one or more portions may be frangible, and designed to render an open circuit in response to tampering or attempted tampering. For instance, one or more switches (e.g., 310c or 310d) or electrical leads, traces, or conductive paths may be formed in a frangible substrate, which breaks in response to tampering. The frangible substrate may take any of a large variety of forms including glasses, ceramics, or even more traditional circuit board materials if suitably thin as to tear, rip, or break if subject to forces associated or expected to be applied if tampered. In some instances, it may be sufficient if the electrical lead, trace, or conductive path is frangible, while the substrate (e.g., circuit board, housing 202) is not frangible. For instance, such may be accomplished where the substrate is sufficiently complaint that the substrate will bend without breaking, while the bending causes a discontinuity to occur in the electrical path. Alternatively, a structure such as a blade or knife may be triggered by attempted tampering, to sever the electrical path, resulting in an open circuit condition which renders the portable charging device 350 inoperable.

The housing 302b may provide a protection to prevent or deter tampering, and may be formed of suitably strong and resilient materials (e.g., ABS plastic). Such may not only prevent or deter tampering, but may leave a visible indication of any tampering attempts. For example, the housing 302b may include a strong outer layer of a first color (e.g., black) within an inner layer of a second color (e.g., fluorescent orange) there beneath. Such will render attempts to cut through the housing 302b visibly apparent.

It is also noted that the housing 302b may serve as the aforementioned substrate, or a frangible substrate may be secured to an inner portion of the housing, for instance, via suitable adhesives. Thus, tampering with the housing 302b may break or damage a circuit connection, again rendering the device inoperable.

In some embodiments, some or all of the components of the portable electric storage device security system controller 306b may be located outside of the portable charging device 350 as a separate device that actuates the switches 310c and 310d or otherwise controls charging and/or authentication (e.g., via a wireless control signal). Also, additional or fewer switches may be used sufficient to prevent or allow the flow of current to and from the portable charging device power source 304b.

In some embodiments, the portable charging device 350 may be lent leased, sold, licensed or otherwise provided to users of the collection, charging and distribution machine system 102 and/or other users who exclusively use portable charging devices for charging their portable electrical energy storage devices for their electric vehicles or other items. The portable electrical energy storage devices and associated portable charging devices provided to a particular user may have a code, identifier or other credential information stored thereon or otherwise associated therewith to associate the user, user account, user vehicle, user security device or token, and/or user mobile device, with the corresponding portable electrical energy storage devices and/or portable charging devices provided to the user. This may be such that the user is only able to charge portable electrical energy storage devices associated with that user, a vehicle of the user, a mobile device of the user, other security device of the user, and/or associated with the particular portable charging devices provided, registered, or assigned to that user.

FIG. 3C is a block diagram of a portable charging device 350 connected to and in communication with the portable electrical energy storage device 106z and/or with the vehicle 108 of FIG. 1, according to one non-limiting illustrated embodiment.

The information received on which the authentication of the portable electrical energy storage device 106z and/or the portable charging device 350 may be based includes information regarding identification of a vehicle associated with a user, a vehicle associated with a user account, a vehicle associated with a mobile device of the user, a vehicle associated with the portable electrical energy storage device 106z and/or a vehicle associated with the portable charging device 350, etc. For example, this information may be communicated via communication channel 358e. Also, the amount of energy released by the portable charging device 350 and/or an amount of charge accepted from the portable charging device 350 for charging the portable electrical energy storage device 106z, if any, may depend on one or more of the following, which may be indicated by information received by the portable electric storage device security system controller 306a, from the portable charging device 350 security system controller 306b or other external device or system (e.g., back end system 120): a type of the vehicle 108; a vehicle profile of a user; communication from various subsystems, diagnostic systems, and/or control systems of the vehicle 108; a type of portable electrical energy storage device used by the vehicle 108; driving routs or habits associated with the vehicle 108; portable electrical energy storage device exchange history associated with the vehicle 108. This information may be communicated, for example, over wireless communication channel 358e between the vehicle 108 and the portable charging device 350 and/or other communication channels described herein.

Also, the portable electrical energy storage device 106z may be operably placed in or installed in the vehicle 108 while directly or indirectly connected to the portable charging device 350 for charging. In some embodiments, the portable electrical energy storage device 106z must be connected to a security system of the vehicle 108 or otherwise connected to the vehicle 108 for the vehicle 108 and/or the portable electrical energy storage device 106z to provide the proper authentication information over wireless communication channel 358a and/or 358e.

In some embodiments, the portable charging device 350 may be lent leased, sold, licensed or otherwise provided to users of the collection, charging and distribution machine system 102 and/or other users who exclusively use portable charging devices for charging their portable electrical energy storage devices for their electric vehicle 108 or other items. The portable electrical energy storage devices and associated portable charging devices provided to a particular user may have a code, identifier or other credential information stored thereon or otherwise associated therewith to associate the user, user account, user security device or token, and/or user mobile device, with the corresponding vehicle 108 (e.g., via a vehicle identifier). This may be such that the user is only able to charge portable electrical energy storage devices and/or use portable charging devices associated with that user, a vehicle of the user, a mobile device of the user, other security device of the user, and/or associated with corresponding particular portable charging device(s) and/or particular portable electrical energy storage device(s) provided, registered, or assigned to that user.

Figure 4:
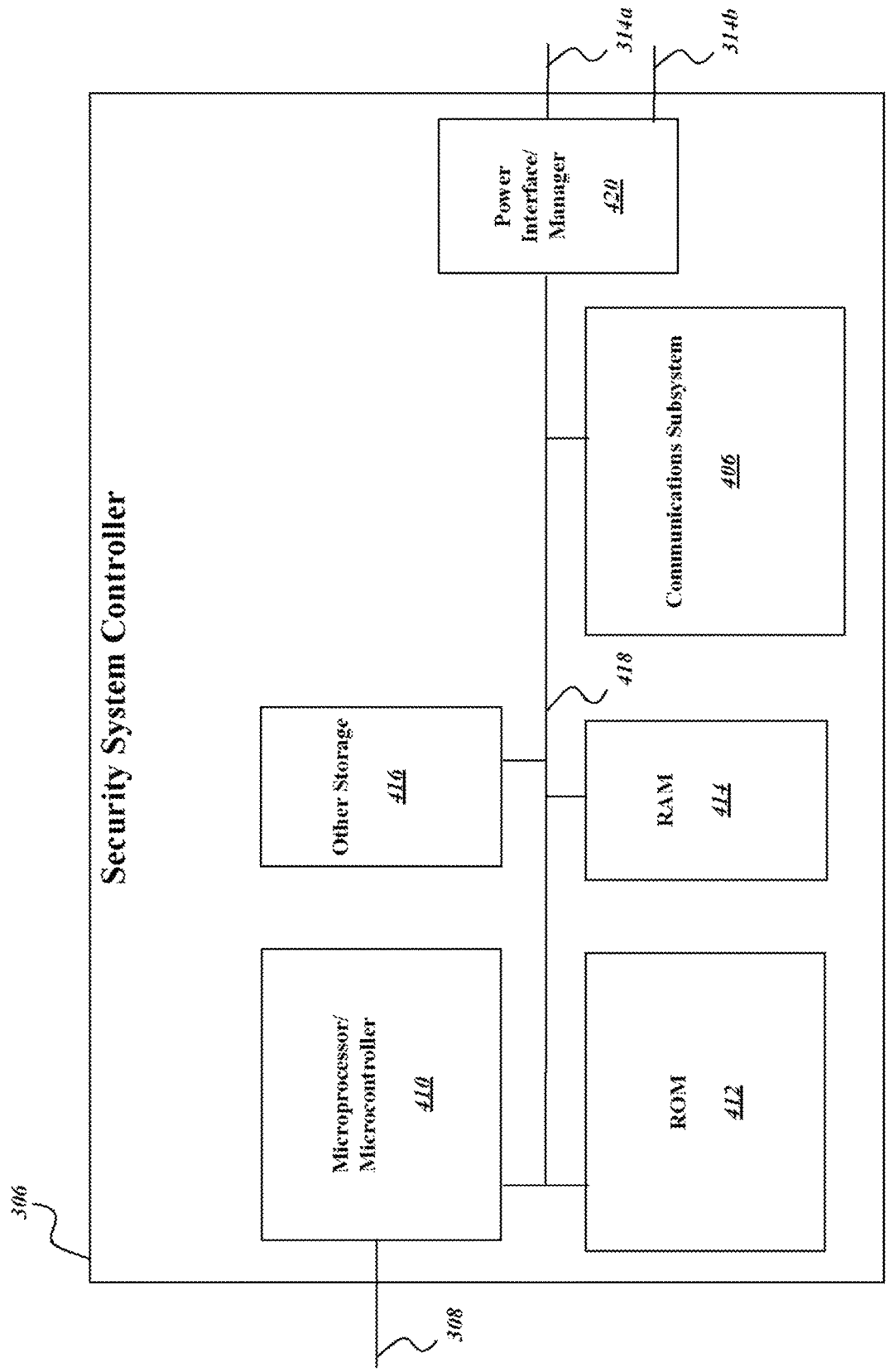
FIG. 4 is a schematic view of the security system controller of FIG. 3A, FIG. 3B or FIG. 3C, according to various non-limiting illustrated embodiments.

FIG. 4 is a schematic view of an example security system controller shown in FIG. 3A, FIG. 3B or FIG. 3C, according to various non-limiting illustrated embodiments.

The security system controller 306 includes a controller 410, a communications subsystem 406, and a power interface/manager. The security system controller 306 may be that of the portable charging device 350 shown in FIGS. 3B and 3C and/or the portable electrical energy storage device 106z, as applicable.

The controller 410, for example is a microprocessor, microcontroller, programmable logic controller (PLC), programmable gate array (PGA), application specific integrated circuit (ASIC) or another controller capable of receiving signals from various sensors, performing logical operations, and sending signals to various components. Typically, the controller 410 may take the form of a microprocessor (e.g., INTEL, AMD, ATOM). The security system controller 306 may also include one or more non-transitory processor- or computer-readable storage media, for example read only memory (ROM) 412, random access memory (RAM) 414, and other storage 416 (e.g., solid-state storage media such as flash memory or EEPROM, spinning storage media such as hard disk). The non-transitory processor- or computer-readable storage media 412, 414, 416 may be in addition to any non-transitory storage medium (e.g., registers) which is part of the controller 410. The security system controller 306 may include one or more buses 418 (only one illustrated) coupling various components together, for example one or more power buses, instruction buses, data buses, etc.

As illustrated, the ROM 412, or some other one of the non-transitory processor- or computer-readable storage media 412, 414, 416, stores instructions and/or data or values for variables or parameters. The sets of data may take a variety of forms, for example a lookup table, a set of records in a database, etc. The instructions and sets of data or values are executable by the controller 410. Execution of the instructions and sets of data or values causes the controller 410 to perform specific acts to cause the security system controller 306 to generate control signals to, as applicable: allow or prevent the portable electric storage device 106z from accepting a charge or releasing energy; otherwise regulate the release of energy from or amount of charge accepted by the portable electric storage device 106z; allow or prevent the portable charging device 350 from providing or delivering a charge or releasing energy; and/or otherwise regulate the release of energy, or amount thereof, from portable charging device 350, etc. Specific operation of the security system controller 306 is described herein and also below with reference to various flow diagrams (5-7).

The controller 410 may use RAM 414 in a conventional fashion, for volatile storage of instructions, data, etc. The controller 410 may use data store 416 to log or retain information, for example, information regarding user profile information, vehicle profile information, security codes, credentials, security certificates, passwords, the subscription level of users, particular promotions being offered related to the identified user or to general users, demographic information of users such as (income level, weight, size gender, age, net worth, marital status, other information described herein, etc.), information regarding user vehicle locations and telematic and/or telemetric user vehicle information, information regarding type, settings configurations, specifications, conditions and/or capabilities of a vehicle, information regarding portable electrical energy storage device charge capacity, information regarding route information of users, etc. The instructions are executable by the controller 410 to control operation of the security system controller 306 in response to input from remote systems such as those of portable charging device 350 and/or portable electrical energy storage device 106z, as applicable, including but not limited to: portable charging devices, vehicles, user identification devices (cards, electronic keys, etc.) vehicles, collection, charging and distribution machines, collection, charging and distribution machine service systems, user mobile devices, user vehicles, and end user or operator input, and using data or values for the variables or parameters.

The control subsystem 402 may also receive signals from various sensors and/or components of a portable charging device 350 via the communications subsystem 206 of collection, charging and distribution machine 102. This information may include information that characterizes or is indicative of the authenticity, authorization level, operation, status, or condition of such components.

The communications subsystem 406 may include one or more communications modules or components which facilities communications with the various components of portable charging devices 350 and also the various components of the collection, charging and distribution machine 102 of FIG. 1 (e.g., such as to receive software updates or data updates of user profile, vehicle profile and/or promotional campaign information) and one or more user mobile communication devices, such that data may be exchanged between the devices for authentication purposes. The communications subsystem 406 may provide wired and/or wireless communications. The communications subsystem 406 may include one or more ports, wireless receivers, wireless transmitters or wireless transceivers to provide wireless signal paths to the various remote components or systems. The communications subsystem 406 may, for example, include components enabling short range (e.g., via Bluetooth, near field communication (NFC), radio frequency identification (RFID) components and protocols) or longer range wireless communications (e.g., over a wireless LAN, satellite, or cellular network) and may include one or more modems 452 or one or more Ethernet or other types of communications cards or components 454 for doing so. The remote communications subsystem 406 may include one or more bridges or routers suitable to handle network traffic including switched packet type communications protocols (TCP/IP), Ethernet or other networking protocols.

In some embodiments, some or all of the components of the security system controller 306 may be located outside of the portable electric storage device 106z as a separate device that actuates the switches 310a and 310b of the portable electric storage device 106z (e.g., via a wireless control signal) sent via the communications subsystem 406.

The Power Interface/Manager 420 is controllable by the controller 410 and is configured to provide power to the security system controller 306 from either the battery cell 304a, power source 304b, or other external power source. Also, the Power Interface/Manager 420 is configured to regulate the release of power from or delivery of charge to the portable electric storage device 106z and/or the portable charging device 350, as applicable, according to control signals received from the controller 410. The security system controller 306 includes various components operable for doing so such as electrical transformers, converters, rectifiers, etc.

Figure 5:
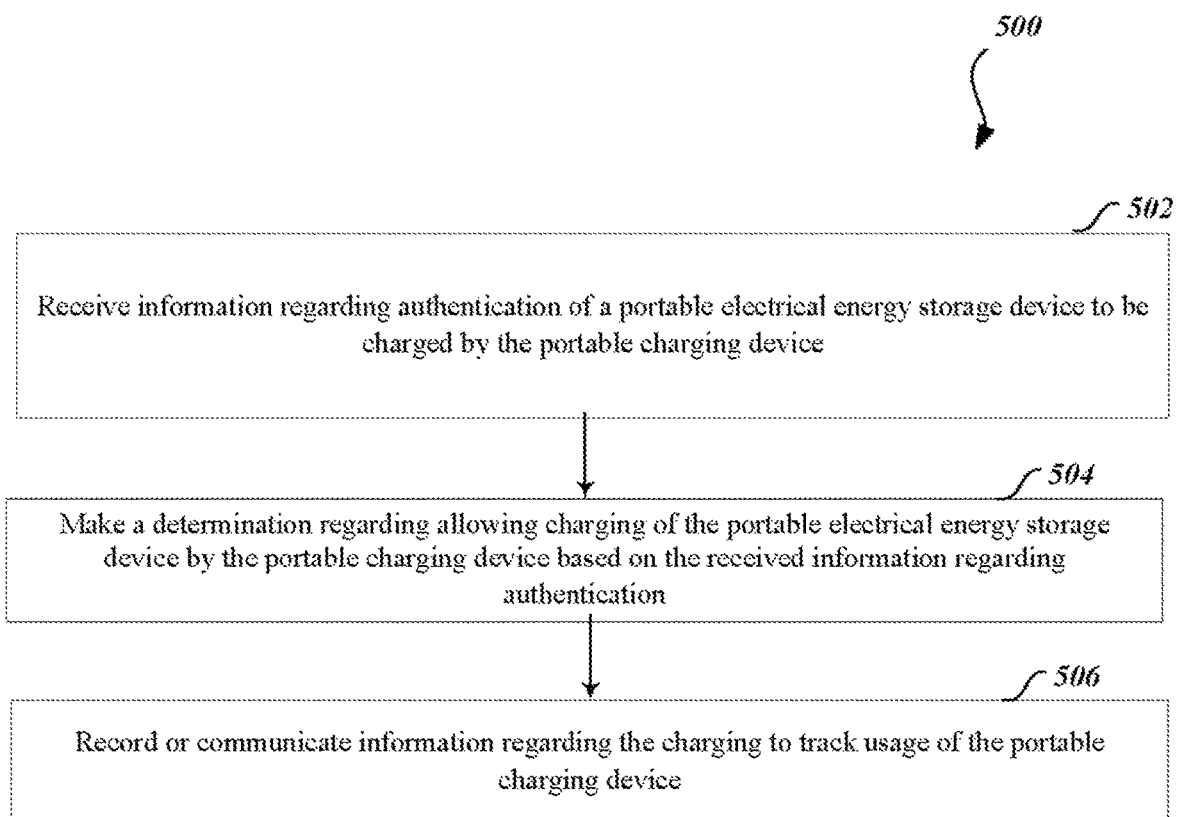
FIG. 5 is a flow diagram showing a first method of operating the security system controller of FIG. 4, according to one non-limiting illustrated embodiment.

FIG. 5 is a flow diagram showing a first method 500 of operating the security system controller 306 of FIG. 4, according to one non-limiting illustrated embodiment.

At 502, the security system controller 306 receives information regarding authentication of a portable electrical energy storage device to be charged by the portable charging device.

At 504, the security system controller 306 makes a determination regarding allowing charging of the portable electrical energy storage device by the portable charging device based on the received information regarding authentication.

At 506, the security system controller 306 records or communicates information regarding the charging to track usage of the portable charging device.

Figure 6:
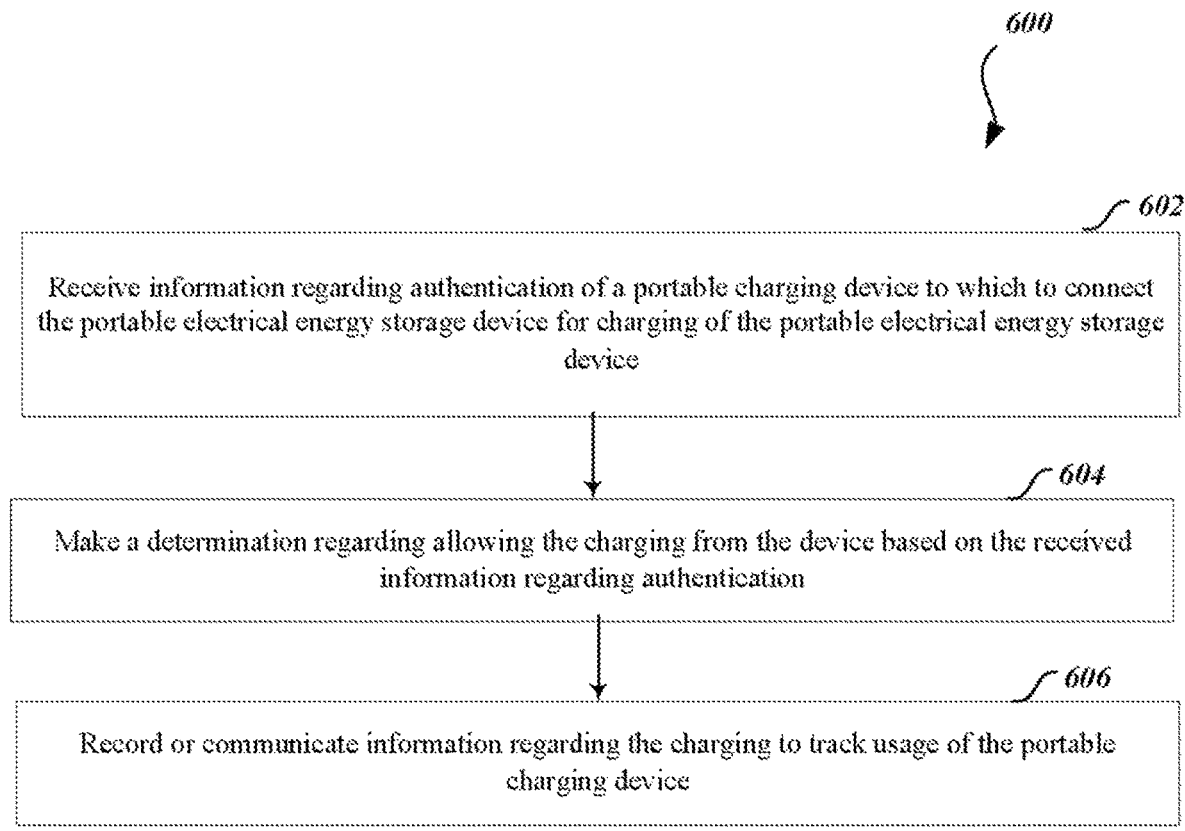
FIG. 6 is a flow diagram showing a second method of operating the security system controller of FIG. 4, according to one non-limiting illustrated embodiment.

FIG. 6 is a flow diagram showing a second method 600 of operating the security system controller 306 of FIG. 4, according to a non-limiting illustrated embodiment.

At 602, the security system controller 306 receives information regarding authentication of a portable charging device to which to connect the portable electrical energy storage device for charging of the portable electrical energy storage device.

At 604, the security system controller 306 makes a determination regarding allowing the charging from the device based on the received information regarding authentication.

At 606, the security system controller 306 records or communicates information regarding the charging to track usage of the portable charging device.

Figure 7:
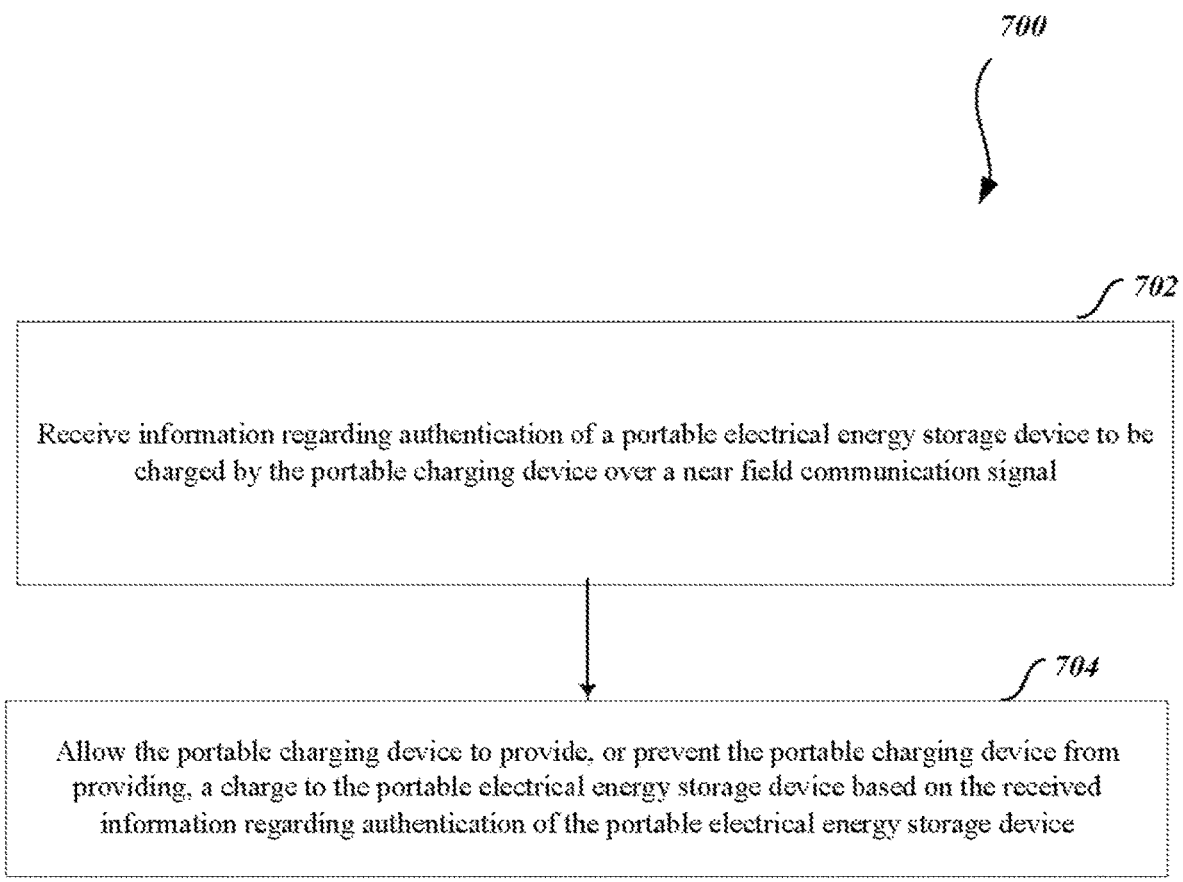
FIG. 7 is a flow diagram showing a third method of operating the security system controller of FIG. 4, according to one non-limiting illustrated embodiment.

FIG. 7 is a flow diagram showing a third method 700 of operating the security system controller 306 of FIG. 4, according to a non-limiting illustrated embodiment.

At 702, the security system controller 306 receives information regarding authentication of a portable electrical energy storage device to be charged by the portable charging device over a near field communication signal.

At 704, the security system controller 306 allows the portable charging device to provide, or prevents the portable charging device from providing, a charge to the portable electrical energy storage device based on the received information regarding authentication of the portable electrical energy storage device.

The various methods described herein may include additional acts, omit some acts, and/or may perform the acts in a different order than set out in the various flow diagrams.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via one or more microcontrollers. However, those skilled in the art will recognize that the embodiments disclosed herein, in whole or in part, can be equivalently implemented in standard integrated circuits (e.g., Application Specific Integrated Circuits or ASICs), as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the code for the software and/or firmware would be well within the skill of one of ordinary skill in the art in light of the teachings of this disclosure.

When logic is implemented as software and stored in memory, logic or information can be stored on any non-transitory computer-readable medium for use by or in connection with any processor-related system or method. In the context of this disclosure, a memory is a non-transitory computer- or processor-readable storage medium that is an electronic, magnetic, optical, or other physical device or means that non-transitorily contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any physical element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), and digital tape.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to: U.S. provisional patent application Ser. No. 61/511,900 entitled "APPARATUS, METHOD AND ARTICLE FOR COLLECTION, CHARGING AND DISTRIBUTING POWER STORAGE DEVICES, SUCH AS BATTERIES" and filed Jul. 26, 2011, U.S. provisional patent application Ser. No. 61/647,936 entitled "APPARATUS, METHOD AND ARTICLE FOR COLLECTION, CHARGING AND DISTRIBUTING POWER STORAGE DEVICES, SUCH AS BATTERIES" and filed May 16, 2012, U.S. provisional patent application Ser. No. 61/534,753 entitled "APPARATUS, METHOD AND ARTICLE FOR REDISTRIBUTING POWER STORAGE DEVICES, SUCH AS BATTERIES, BETWEEN COLLECTION, CHARGING AND DISTRIBUTION MACHINES" and filed Sep. 14, 2011, U.S. provisional patent application Ser. No. 61/534,761 entitled "APPARATUS, METHOD AND ARTICLE FOR AUTHENTICATION, SECURITY AND CONTROL OF POWER STORAGE DEVICES SUCH AS BATTERIES" and filed Sep. 14, 2011, U.S. provisional patent application Ser. No. 61/534,772 entitled "APPARATUS, METHOD AND ARTICLE FOR AUTHENTICATION, SECURITY AND CONTROL OF POWER STORAGE DEVICES, SUCH AS BATTERIES, BASED ON USER PROFILES" and filed Sep. 14, 2011, U.S. provisional patent application Ser. No. 61/511,887 entitled "THERMAL MANAGEMENT OF COMPONENTS IN ELECTRIC MOTOR DRIVE VEHICLES" and filed Jul. 26, 2011, U.S. provisional patent application Ser. No. 61/647,941 entitled "THERMAL MANAGEMENT OF COMPONENTS IN ELECTRIC MOTOR DRIVE VEHICLES" and filed May 16, 2012, U.S. provisional patent application Ser. No. 61/511,880 entitled "DYNAMICALLY LIMITING VEHICLE OPERATION FOR BEST EFFORT ECONOMY" and filed Jul. 26, 2011, U.S. provisional patent application Ser. No. 61/557,170 entitled "APPARATUS, METHOD, AND ARTICLE FOR PHYSICAL SECURITY OF POWER STORAGE DEVICES IN VEHICLES" and filed Nov. 8, 2011, U.S. provisional patent application Ser. No. 61/581,566 entitled APPARATUS, METHOD AND ARTICLE FOR A POWER STORAGE DEVICE COMPARTMENT' and filed Dec. 29, 2011, U.S. provisional patent application Ser. No. 61/601,404 entitled "APPARATUS, METHOD AND ARTICLE FOR PROVIDING VEHICLE DIAGNOSTIC DATA" and filed Feb. 21, 2012, U.S. provisional patent application Ser. No. 61/601,949 entitled "APPARATUS, METHOD AND ARTICLE FOR PROVIDING LOCATIONS OF POWER STORAGE DEVICE COLLECTION, CHARGING AND DISTRIBUTION MACHINES" and filed Feb. 22, 2012, and U.S. provisional patent application Ser. No. 61/601,953 entitled "APPARATUS, METHOD AND ARTICLE FOR PROVIDING INFORMATION REGARDING AVAILABILITY OF POWER STORAGE DEVICES AT A POWER STORAGE DEVICE COLLECTION, CHARGING AND DISTRIBUTION MACHINE" and filed Feb. 22, 2012, U.S. application Ser. No. 13/559,314, filed on Jul. 26, 2012, naming Hok-Sum Horace Luke, Matthew Whiting Taylor and Huang-Cheng Hung as inventors and entitled "APPARATUS, METHOD AND ARTICLE FOR COLLECTION, CHARGING AND DISTRIBUTING POWER STORAGE DEVICES, SUCH AS BATTERIES", U.S. application Ser. No. 13/559,264, filed on Jul. 26, 2012 naming Hok-Sum Horace Luke and Matthew Whiting Taylor as inventors and entitled "DYNAMICALLY LIMITING VEHICLE OPERATION FOR BEST EFFORT ECONOMY", U.S. application Ser. No. 13/559,054, filed on Jul. 26, 2012, naming Matthew Whiting Taylor, Yi-Tsung Wu, Hok-Sum Horace Luke and Huang-Cheng Hung as inventors and entitled "APPARATUS, METHOD, AND ARTICLE FOR PHYSICAL SECURITY OF POWER STORAGE DEVICES IN VEHICLES", U.S. application Ser. No. 13/559,390, filed on Jul. 26, 2012, naming Ching Chen, Hok-Sum Horace Luke, Matthew Whiting Taylor, Yi-Tsung Wu as inventors and entitled "APPARATUS, METHOD AND ARTICLE FOR PROVIDING VEHICLE DIAGNOSTIC DATA", U.S. application Ser. No. 13/559,343, filed on Jul. 26, 2012, naming Yi-Tsung Wu, Matthew Whiting Taylor, Hok-Sum Horace Luke and Jung-Hsiu Chen as inventors and entitled "APPARATUS, METHOD AND ARTICLE FOR PROVIDING INFORMATION REGARDING AVAILABILITY OF POWER STORAGE DEVICES AT A POWER STORAGE DEVICE COLLECTION, CHARGING AND DISTRIBUTION MACHINE", and U.S. application Ser. No. 13/559,064, filed on Jul. 26, 2012, naming Hok-Sum Horace Luke, Yi-Tsung Wu, Jung-Hsiu Chen, Yulin Wu, Chien Ming Huang, TsungTing Chan, Shen-Chi Chen and Feng Kai Yang as inventors and entitled "APPARATUS, METHOD AND ARTICLE FOR RESERVING POWER STORAGE DEVICES AT RESERVING POWER STORAGE DEVICE COLLECTION, CHARGING AND DISTRIBUTION MACHINES" are incorporated herein by reference, in their entirety. Aspects of the embodiments can be modified, if necessary, to employ systems, circuits and concepts of the various patents, applications and publications to provide yet further embodiments.

While generally discussed in the environment and context of collection, charging and distribution of portable electrical energy storage devices for use with personal transportation vehicle such as all-electric scooters and/or motorbikes, the teachings herein can be applied in a wide variety of other environments, including other vehicular as well as non-vehicular environments.

The above description of illustrated embodiments, including what is described in the Abstract of the Disclosure, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

We claim:

1. A security system of a portable charging device, comprising:
   a controller configured to:
   transmit the information regarding authentication of the portable electrical energy storage device to be charged to a back-end server;
   receive a result of verification from the back-end server; and
   instruct the portable charging device to charge the portable electrical energy storage device based on a result of verification;
   a communications module coupled to the controller, wherein the controller is configured to:
   receive information regarding authentication of a portable electrical energy storage device to be charged by the portable charging device, wherein the information regarding authentication includes a cluster identification of multiple devices external to the portable electrical energy storage device; and
   instruct the portable charging device to charge the portable electrical energy storage device based on the received information regarding authentication, wherein an amount of energy to be released is determined at least partially based on the cluster identification; and
   a first storage configured to store a first key, wherein the information regarding authentication includes a second key stored in a second storage of the portable electrical energy storage device and wherein the controller is further configured to:
   compare the first key and the second key; and instruct the portable charging device to charge the portable electrical energy storage device based on a result of comparing the first key and the second key.

2. The security system of claim 1, wherein the information regarding authentication includes a user account identification associated with the portable electrical energy storage device.

3. The security system of claim 1, wherein the cluster identification is associated with a user account identification.

4. The security system of claim 1, wherein the cluster identification is associated with a subscription level of a user.

5. The security system of claim 1, wherein the information regarding authentication includes a vehicle identification associated with the portable electrical energy storage device.

6. The security system of claim 1, wherein the information regarding authentication includes information associated with an unauthorized charging event or an unauthorized discharging event.

7. The security system of claim 1, wherein the controller is configured to communicate with the back-end server through a vehicle by the communications module via a wireless network.

8. The security system of claim 1, wherein the controller is configured to track usage of the portable charging device.

9. The security system of claim 1, wherein the controller is configured to track usage of the portable electrical energy storage device.

10. The security system of claim 1, further comprising:
a switch coupled to a terminal of the portable charging device and to a power source of the portable charging device, the switch being configured to be activated by a control signal generated by the controller.

11. The security system of claim 1, wherein the controller is configured to associate a tracked usage of the portable electrical energy storage device with a user account.

12. The security system of claim 1, wherein the controller is configured to associate a tracked usage of the portable charging device with a user account.

13. A portable charging device, comprising:
a controller;
a power source coupled to the controller;
a first storage configured to store a first key and
a security system operably coupled to the controller, the security system being configured to: receive information regarding authentication of a portable electrical energy storage device to be charged by the portable charging device, wherein the information regarding authentication includes a cluster identification of multiple devices external to the portable electrical energy storage device, wherein the information regarding authentication includes a second key stored in a second storage of the portable electrical energy storage device; compare the first key and the second key; transmit the information regarding authentication of the portable electrical energy storage device to be charged to a back-end server; receive a result of verification from the back-end server; instruct the portable charging device to charge the portable electrical energy storage device based on a result of comparing the first key and the second key and a result of verification; and instruct the controller of the portable charging device to charge the portable electrical energy storage device based on the received information regarding authentication, wherein an amount of energy to be released is determined at least partially based on the cluster identification.

14. The device of claim 13, wherein the information regarding authentication includes a user account identification associated with the portable electrical energy storage device.

15. The device of claim 13, wherein the cluster identification is associated with a user account identification.

16. The device of claim 13, wherein the information regarding authentication includes information associated with an unauthorized charging event or an unauthorized discharging event of the portable electrical energy storage device.

17. The device of claim 13, wherein the security system is configured to receive the information regarding authentication from the back-end system through a vehicle via a wireless network.

* * * * *